(12) United States Patent
Takahashi et al.

(10) Patent No.: US 7,984,481 B2
(45) Date of Patent: Jul. 19, 2011

(54) IMAGE PROCESSING SYSTEM, IMAGE PROCESSING APPARATUS AND IMAGE PROCESSING METHOD

(75) Inventors: Kenichi Takahashi, Sennan-gun (JP); Daisetsu Tohyama, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1276 days.

(21) Appl. No.: 11/232,894

(22) Filed: Sep. 23, 2005

(65) Prior Publication Data

US 2006/0069918 A1 Mar. 30, 2006

(30) Foreign Application Priority Data

Sep. 30, 2004 (JP) .................................. 2004-288341

(51) Int. Cl.
*G06F 17/30* (2006.01)
(52) U.S. Cl. ............................................. 726/2; 380/55
(58) Field of Classification Search .................. 726/2–7, 726/16–19, 21, 26, 28, 31; 708/100, 173; D18/50; 380/287, 51, 55
See application file for complete search history.

(56) References Cited

U.S. PATENT DOCUMENTS

| | | | | |
|---|---|---|---|---|
| 6,163,383 | A * | 12/2000 | Ota et al. | 358/1.1 |
| 6,421,582 | B1 * | 7/2002 | Wada | 700/232 |
| 6,559,967 | B1 * | 5/2003 | Akiba et al. | 358/1.16 |
| 6,802,000 | B1 * | 10/2004 | Greene et al. | 713/168 |
| 6,859,794 | B2 * | 2/2005 | Takaragi | 705/67 |
| 2002/0169961 | A1 * | 11/2002 | Giles et al. | 713/175 |
| 2004/0010701 | A1 * | 1/2004 | Umebayashi et al. | 713/193 |
| 2004/0030700 | A1 * | 2/2004 | Hakamata | 707/9 |

FOREIGN PATENT DOCUMENTS

| | | |
|---|---|---|
| JP | 2002-240400 A | 8/2002 |
| JP | 2002-373030 | 12/2002 |
| JP | 2002-373070 A | 12/2002 |
| JP | 2003-345789 A | 12/2003 |
| JP | 2004-046307 A | 2/2004 |
| JP | 2004-070404 A | 3/2004 |
| JP | 2004-199521 A | 7/2004 |

OTHER PUBLICATIONS

Japanese Office Action dated Oct. 17, 2006 (with English translation).
Japanese Office Action (with English language translation) Sep. 11, 2007.

* cited by examiner

*Primary Examiner* — Ponnoreay Pich
*Assistant Examiner* — John B King
(74) *Attorney, Agent, or Firm* — Buchanan Ingersoll & Rooney PC

(57) ABSTRACT

An image processing system includes: a document storage apparatus for storing document data therein; an image processing apparatus connected to the document storage apparatus via a network, for processing the document data in association with the document storage apparatus; a first authenticator for performing user authentication at the time of an access to the document storage apparatus; a second authenticator for performing user authentication at the time of an access to the image processing apparatus; and controller for controlling, based on an authentication result by at least one of the first authenticator and the second authenticator, an authenticating operation by the other authenticator.

14 Claims, 22 Drawing Sheets

391

Printer
Name (N): PQRSTUV 3800 ▼  [Property(P)]
Condition: Residual toner : Small-Document waiting for printing : 0
Type: PQRSTUV 3800
To: IP_150.16.172.60
Remark:
☐ Monochromatic printing(B)
☐ Output to file(L)

Printing range
⦿ All (A)
◯ Current page (E)
◯ Designate pages (G) : from (F): [1] to (T): [8]
◯ Selected graphics (S)

Number of print sets
Number of sets (U) : [1] [2] [3]
☐ Print per X set(O)  [1 ▲▼]

[?]            [OK]            [Cancel]
                 ↑
                392

FIG.18

IMAGE PROCESSING SYSTEM, IMAGE PROCESSING APPARATUS AND IMAGE PROCESSING METHOD

This application claims priority under 35 U.S.C. §119 to Japanese Patent Application No. P2004-288341 filed on Sep. 30, 2004, the entire disclosure of which is incorporated herein by reference in its entirety.

BACKGROUND OF THE INVENTION

1. Field of the Invention

The present invention relates to an image processing system, an image processing apparatus and an image processing method, in which a user is authenticated when document data is processed by the use of an MFP (abbreviating a multifunction peripheral) serving as a multi-functional image forming apparatus equipped with the functions of, for example, a copying machine, a printer, a FAX, a scanner and the like or an image processing apparatus such as a printer.

2. Description of the Related Art

The following description sets forth the inventor's knowledge of related art and problems therein and should not be construed as an admission of knowledge in the prior art.

In recent years, there has been prevailed an image processing apparatus such as an MFP or a printer, in which a department password or the like is input when the image processing apparatus is used in order to manage the billing by counting the number of printed sheets used per affiliation department.

The recent MFP has had the enhanced function of each of a FAX, a printer, a scanner and many functions for processing document data, and further, has had an increased mounted memory capacity. Therefore, the MFP can set a personal document data storing region in itself, so as to manage document data which has been personally used.

In the meantime, there have been prevailed services, for example, that more document data are shared within a department by storing document data or the like scanned by the MFP in a server, and that the billing is handled by storing document data or contents in a server installed on a side of a service provider and supplying the document data or the contents via a network.

Additionally, there have been increased situations in which multifaceted application programs for processing document data are provided and are used by a previously given license.

Moreover, there has been proposed a system capable of calling up documents stored in memories in other MFPs in an MFP activated at present in association with the other MFPs via a network.

According to the above-described environmental variations such as the reinforcement of the functions of the MFP, the prevalence of a document storage server, the provision of various application programs and the association with the other MFPs, it has been more necessary to reinforce the management of usage conditions of each of the functions of the MFP, the management of the stored documents, the management of an access to the document storage server and the management of usage conditions of document processing application programs in order to ensure the security.

Japanese Unexamined Patent Publication No. 373,070 (2002) discloses, as one of conventional systems for printing a document stored in a web server by accessing the web server from an MFP, a method in which upon inputting of web server authentication information and a document number in the MFP, a request to output a document corresponding to the document number is sent to the server from the MFP, and then, designated document data is transmitted to the MFP from the server, wherein a printing operation is performed by priority of other jobs by inputting the authentication information again in the case where the document data is printed in the MFP.

However, in the above-described prior art, a user must be authenticated twice, that is, at the time of the access to the document storage server and the printing operation in the MFP. Therefore, the user has been forced to input a user ID or a password every time, thereby inducing cumbersomeness from the viewpoint of the operation.

There has been a possibility that such a burden from the viewpoint of the operation further grows as a usage range of an image input/output function in the MFP is enlarged, and therefore, processing is performed in association with a plurality of servers or application programs or other MFPs.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image processing system capable of improving the operability of a user while ensuring the security of a document processing environment.

Among other potential advantages, some embodiments can provide an image processing apparatus which can be suitably used in the above-described system.

Among other potential advantages, some embodiments can provide an image processing method capable of improving the operability of a user while ensuring the security of a document processing environment.

According to a first aspect of a preferred embodiment of the present invention, an image processing system, comprises:

a document storage apparatus for storing document data therein;

an image processing apparatus connected to the document storage apparatus via a network, for processing the document data in association with the document storage apparatus;

a first authenticator for performing user authentication at the time of an access to the document storage apparatus;

a second authenticator for performing user authentication at the time of an access to the image processing apparatus; and a controller for controlling, based on an authentication result by at least one of the first authenticator and the second authenticator, an authenticating operation by the other authenticator.

According to a second aspect of a preferred embodiment of the present invention, an image processing system, comprises:

a terminal which uses an application program;

an image processing apparatus connected to the terminal via a network, for executing processing according to a file processed by the use of the application program at the terminal;

a first authenticator for performing user authentication when the application program is used;

a second authenticator for performing user authentication when the image processing apparatus is used; and a controller for controlling an authenticating operation by the second authenticator based on an authentication result by the first authenticator.

According to a third aspect of a preferred embodiment of the present invention, an image processing apparatus connected to a document storage apparatus for storing document data therein via a network, for processing the document data in association with the document storage apparatus, the image processing apparatus, comprises:

an authenticator for performing user authentication; and a controller for controlling an authenticating operation by the authenticator based on a result of the user authentication performed at the time of an access to the document storage apparatus.

According to a fourth aspect of a preferred embodiment of the present invention, an image processing method, comprises the steps of:

first authenticating a user at the time of an access to a document storage apparatus for storing document data therein;

second authenticating a user at the time of an access to an image processing apparatus connected to the document storage apparatus via a network, for processing the document data in association with the document storage apparatus; and, controlling, based on an authentication result in at least one of the first authenticating step and the second authenticating step, the contents of the other authenticating step.

According to a fifth aspect of a preferred embodiment of the present invention, an image processing method, comprises the steps of:

first authenticating a user at the time of the usage of an application program at a terminal;

second authenticating a user at the time of the usage of an image processing apparatus connected to the terminal via a network, for executing processing according to a file processed by the use of the application program at the terminal; and controlling the contents of the second authenticating step based on an authentication result in the first authenticating step.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 18 is a diagram illustrating a screen for setting a printing mode by the printer driver;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
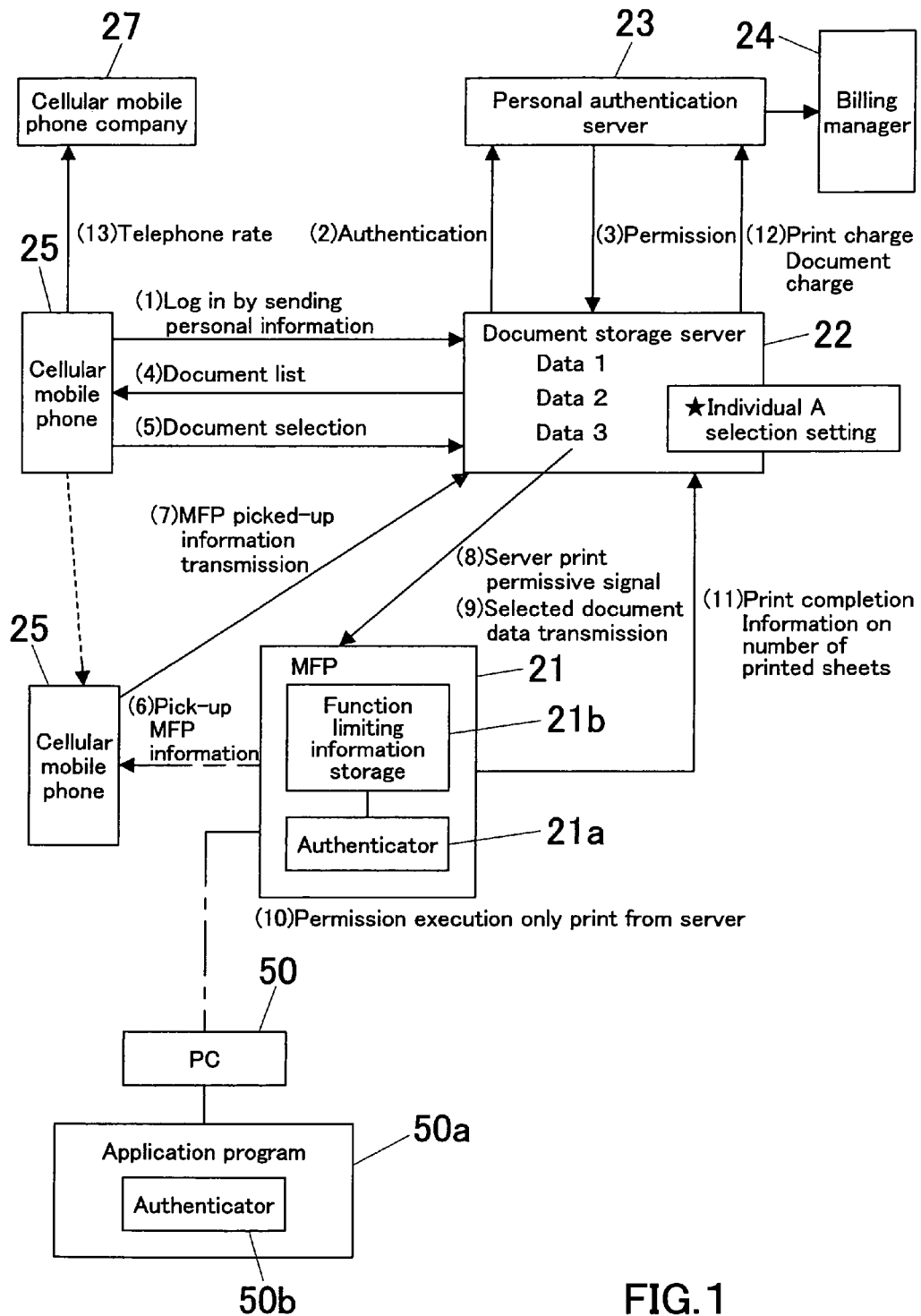
FIG. 1 is a diagram illustrating the arrangement of an image processing system in a preferred embodiment according to the invention.

FIG. 1 is a block diagram illustrating the arrangement of an image processing system in a preferred embodiment according to the invention.

In FIG. 1, in the image processing system, an MFP 21 exemplifying an image processing apparatus, a document storage server 22, a personal authentication server 23 and a cellular mobile phone 25 serving as a user terminal, and a personal computer (hereinafter abbreviated as "a PC") 50 serving as another user terminal are connected to each other via a network 51 (see FIG. 2).

In the host PC 50 is installed an application program 50*a* equipped with an authenticating function. An authenticator 50*b* is adapted to authenticate a user in using the program 50*a*.

Here, although there is shown an example in which the application program 50*a* is installed in the PC 50, the application program 50*a* may be stored in an external server or the like, to be used by the host PC 50. Otherwise, authentication information, which is obtained not only when the user is authenticated by the authenticator 50*b* in usage but also when the user is authenticated in installing the application program 50*b* in the host PC 50, may be stored in the authenticator 50*b*, to be then read out in the usage.

The MFP 21 is a multi-functional image forming apparatus equipped with a copying function, a printing function, a facsimile function, a scanning function and the like, and includes therein an authenticator 21*a* having the function of individually managing users or departments which use the MFP 21. The authenticator 21*a* serves as the second authenticating means when a user accesses the MFP 21 so as to use document data stored in the document storage server 22.

A function limiting information storage 21*b* stores therein limiting information on each of functions which are set per account user.

The MFP 21 can be logged in from the cellular mobile phone 25 or the PC 50 of the user. Incidentally, the telephone rate of the cellular mobile phone 25 is collected by a cellular mobile phone company 27.

The document storage server 22 stores therein the document data (which is a concept including image data) which can be used by the user. At the request from a user that he or she should intend to acquire the document data, the personal authentication server 23 serving as first authenticating means is allowed to perform an authenticating processing as to whether or not the user is a proper user (i.e., a previously permitted user) of the document storage server 22. Furthermore, the authentication information obtained by the personal authentication server 23 and user identification information are designed to be transmitted to the MFP 21 after they are added or not added to the document data.

Incidentally, first authentication information includes, for example, an authentication result (i.e., a print permitting signal) and the user identification information.

Figure 2:
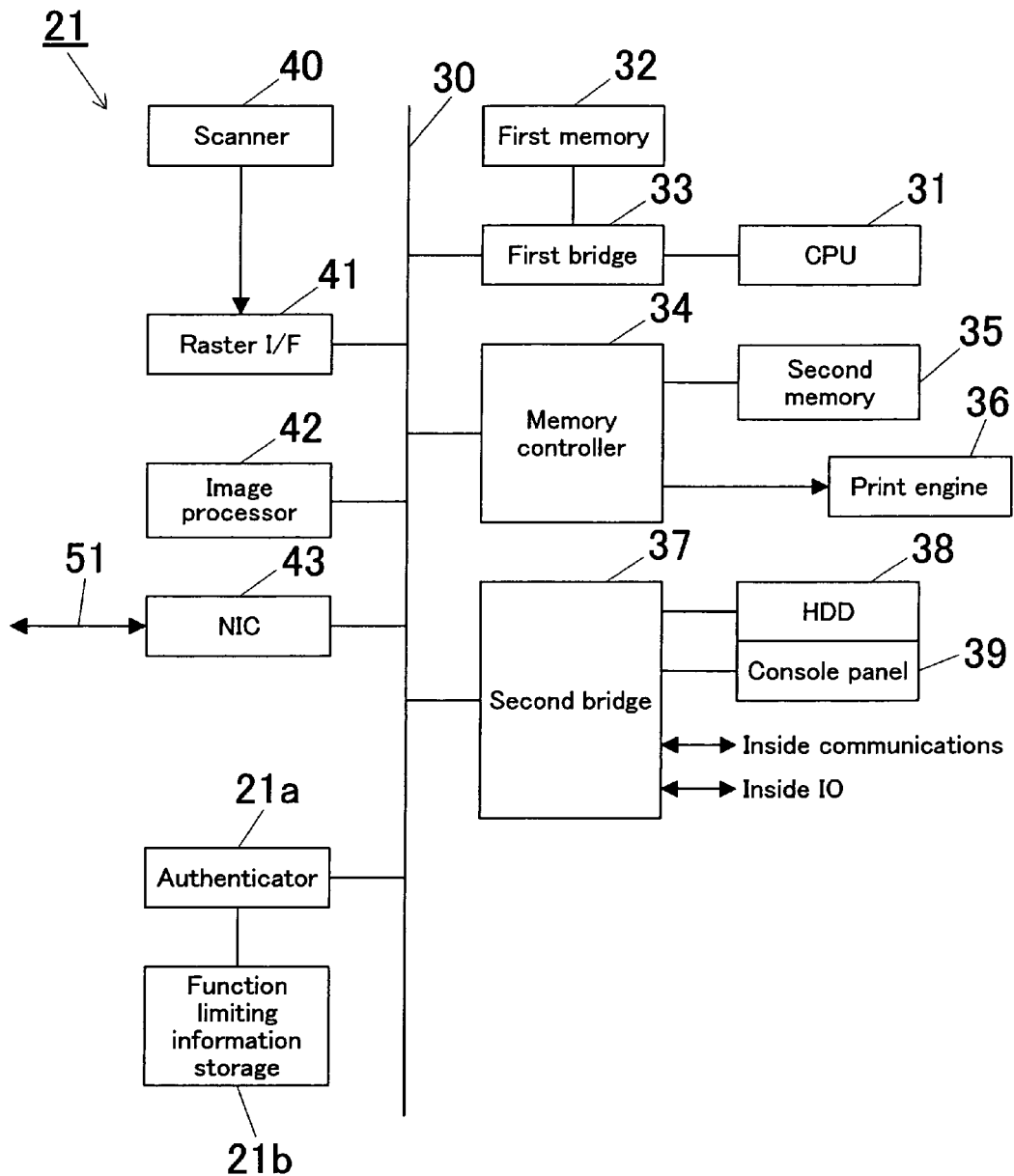
FIG. 2 is a block diagram illustrating the electric arrangement of an MFP in the image processing system in the preferred embodiment according to the invention.

FIG. 2 is a block diagram illustrating the electric arrangement of the MFP 21.

In FIG. 2, a CPU 31 and a first memory 32 (i.e., a work memory) are connected to a bus 30 via a first bridge 33.

The CPU 31 serving as a controller controls not only the entire operation of the MFP 21 but also an authenticating operation of the second authenticator 21*a* according to an authentication result obtained by the first authenticator (i.e., the personal authentication server) 23 in the present preferred embodiment. Specifically, the CPU 31 controls to prevent any second authentication in the case where authentication is established in the authentication server 23 serving as the first authenticator.

Moreover, the CPU 31 permits the user to use the MFP 21 within a range, in which the functions of the MFP 21 are limited, based on the added first authentication information.

Additionally, the CPU 31 performs a corresponding account processing in the case where the user identification information used for judging the authentication by the first authenticator (i.e., the personal authentication server) 23 exists as a destination of a user account in the MFP 21: in contrast, the CPU 31 performs an account processing as a public user in the case where there exists no user identification information.

To the bus 30 are connected devices required for each of the data processing such as a memory controller 34, a second bridge 37, a raster interface (I/F) 41 with respect to a scanner 40, an image processor 42 for converting R, G and B signals into Y, M, C and K signals and the authenticator 21*a* having a user account.

To the memory controller 34 is connected a second memory 35 serving as a file memory. To the second bridge 37 are connected a hard disk (i.e., an HDD) 38 and an operation panel 39.

The document data (including the image data) scanned by the scanner 40 is transferred to the first memory 32 serving as a main memory through the bus 30 and the first bridge 33 via the raster I/F 41. The data transferred to the first memory 32 is further transferred to the image processor 42 via the bus 30, and then, is subjected to a necessary image processing, and finally, is returned to the first memory 32.

Thereafter, the data is sent to a print engine 36 through the memory controller 34, to be thus printed on a sheet.

The MFP 21 and a network 51 are connected to each other via an NIC (abbreviating "a network interface card") 43, so that the document data from the document storage server 22 or the like is received via the NIC 43 or the document data scanned by the scanner 40 is transmitted to the document storage server 22 via the NIC 43.

In printing, print data is transferred to the first memory 32 via the NIC 43. The transferred data is converted into bit map data, which can be read and printed by the CPU 31, and then, is written in the first memory 32.

The produced bit map data is processed by the image processor 42, and thereafter, is transferred to the first memory 32 as the print data. After that, the print data is sent to the print engine 36 via the memory controller 34.

Next, explanation will be made below on the outline of the operation of the image processing system in reference to FIG. 1. Here, the document data stored in the document storage server 22 is selected, and then, the selected document data is output to the MFP 21.

(1) First, the user sends account information (i.e., personal information) to the document storage server 22 by the use of the cellular mobile phone 25 for the purpose of log-in.

(2) The document storage server 22 sends the sent account information to the personal authentication server 23.

(3) The document storage server 22 obtains the user authentication and a user access authority with respect to requested document data from the personal authentication server 23.

(4) The document storage server 22 permits the user to log in and access data based on the obtained authentication permissive information and data access authority.

(5) The user who can log in and access the data selects, from accessible data, document data which he or she intends to print in the MFP 21.

Subsequently, a description will be given below of operation as next steps performed by the user, in which the selected document data is output to the designated MFP 21, thereby obtaining a print output. Here, the MFP 21 is managed per department, so that only the user having an account can be permitted to use the MFP 21.

(6) The user picks up MFP information such as an identification code displayed on the MFP 21 by using a camera function of the cellular mobile phone 25 in order to transmit the information on the MFP 21 as a destination to the document storage server 22.

(7) The user transmits the picked-up MFP information to the document storage server 22.

(8) The document storage server 22, which has received the MFP information on the MFP 21 designated as the destination by the user, transmits a print permissive signal to the MFP 21.

(9) Moreover, the document storage server 22 transmits the document data corresponding to the print permissive signal, selected by the user, thereby permitting the MFP 21 to perform a printing operation.

(10) The MFP 21 prints the document data transmitted from the document storage server 22.

(11) After the completion of the printing operation, the MFP 21 transmits information on the number of printed sheets to the document storage server 22.

(12) The document storage server 22 calculates a billing based on the print information transmitted from the MFP 21, and then, transmits the billing to the personal authentication server 23 in association with the printed user information.

(13) The personal authentication server 23 transmits the personal information and the billing to a billing manager 24, thereby giving the billing to the user. As a consequence, the user pays the charge together with the telephone rate to the cellular mobile phone company 27.

In the case where the data is transmitted from the document storage server 22 to the MFP 21, in which the department or account is managed, and then, is printed out, it has been conventionally necessary to perform authentication for logging in with respect to the MFP 21 again.

In contrast, according to the embodiment, once the authentication is established in the document storage server 22, the authenticating operation in the MFP 21 can be omitted based on the authentication result, thus enhancing operability without any cumbersome work of inputting a password or ID twice by the user.

[Individual Transmission of Document Data and Authentication Information from Document Storage Server 22 to MFP 21]

Next, processing on the side of the document storage server 22 will be described below in reference to a flowchart shown in FIG. 3. Incidentally, a step is abbreviated as "S" in the following description and drawings.

Figure 3:
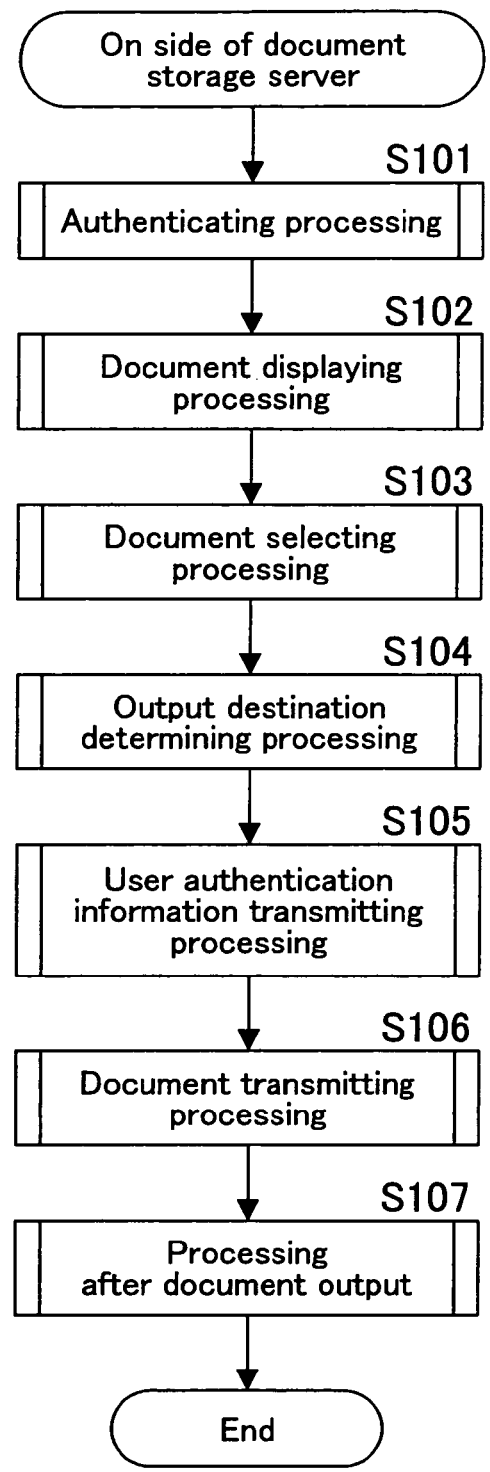
FIG. 3 is a flowchart illustrating processing to be executed by a document storage server in the case where document data and authentication information are individually transmitted.

As shown in FIG. 3, the document storage server 22 performs an authenticating processing in S101, a document displaying processing in S102, a document selecting processing in S103, an output destination determining processing in S104, a user authentication information transmitting processing in S105, a document transmitting processing in S106 and processing after document output in S107.

Figure 4:
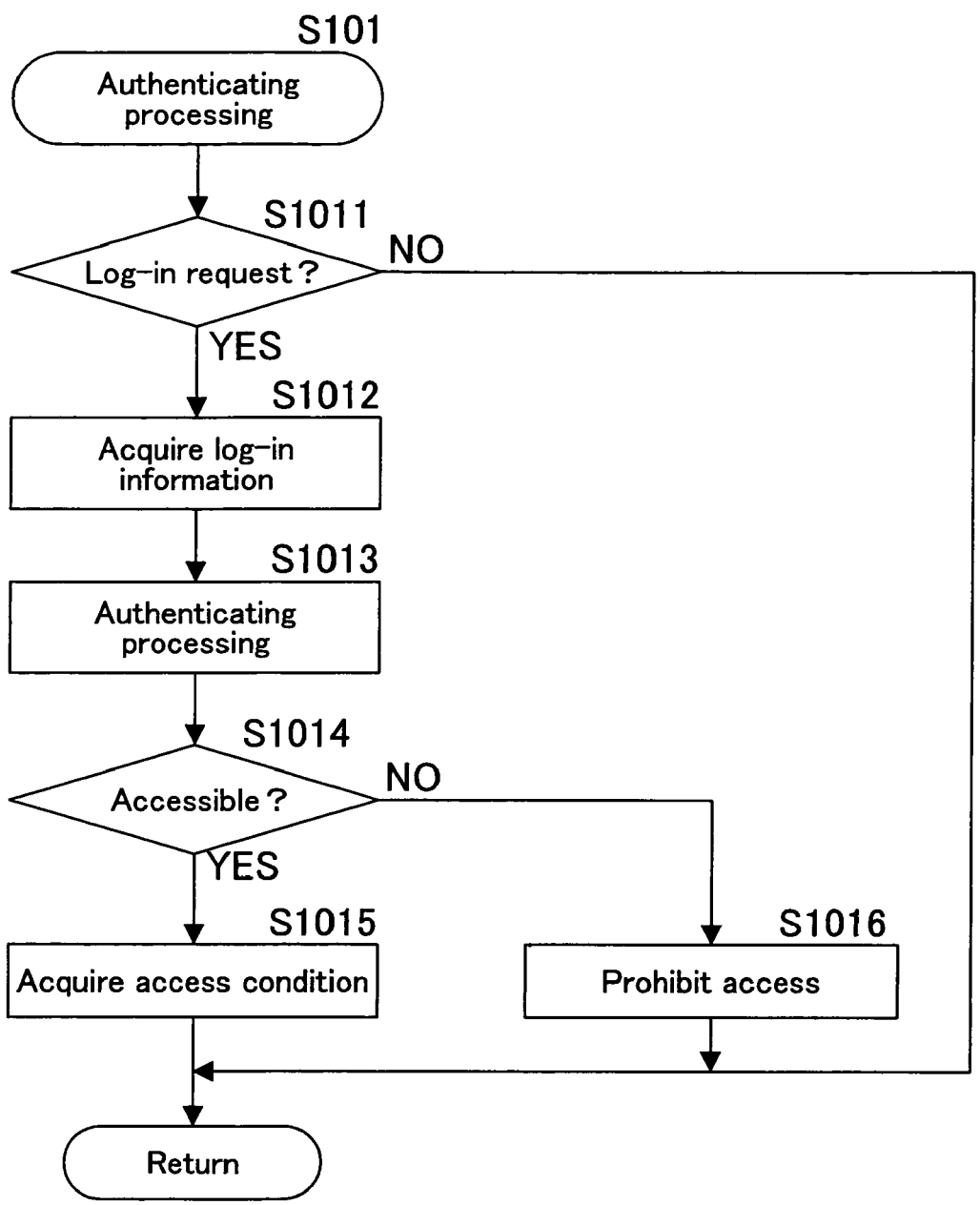
FIG. 4 is a flowchart illustrating a sub-routine of an authenticating processing shown in FIG. 3.

FIG. 4 is a flowchart illustrating a sub-routine of the authenticating processing (S101). In this authenticating processing, the user who requests the log-in is authenticated.

In FIG. 4, it is judged in S1011 as to whether or not the log-in is requested for the document storage server 22. If there is no log-in request (i.e., the judgment in S1011 is NO), a routine is returned without performing any processing. In contrast, if there is a log-in request (i.e., the judgment in S1011 is YES), information on the user who requests the log-in is obtained by acquiring log-in information in S1012.

In S1013, the authenticating processing, that is, the information on the user who requests the log-in is inquired of the personal authentication server 23, and then, its result is obtained. In S1014, it is judged based on the obtained authentication result as to whether or not the document data can be accessed (i.e., permitted). If the document data can be accessed (i.e., the judgment in S1014 is YES), an access condition, that is, an authority with respect to each of the document data on the user who requests the log-in is acquired in S1015. Here, the authority with respect to each of the document data signifies an authority for reading the document data, an authority for performing the printing operation, an authority for operating a file and the like.

In contrast, if the document data cannot be accessed (i.e., the judgment in S1014 is NO), it reveals that the user does not have the log-in authority, so that no access is permitted in S1016, and then, the routine is returned.

Figure 5:
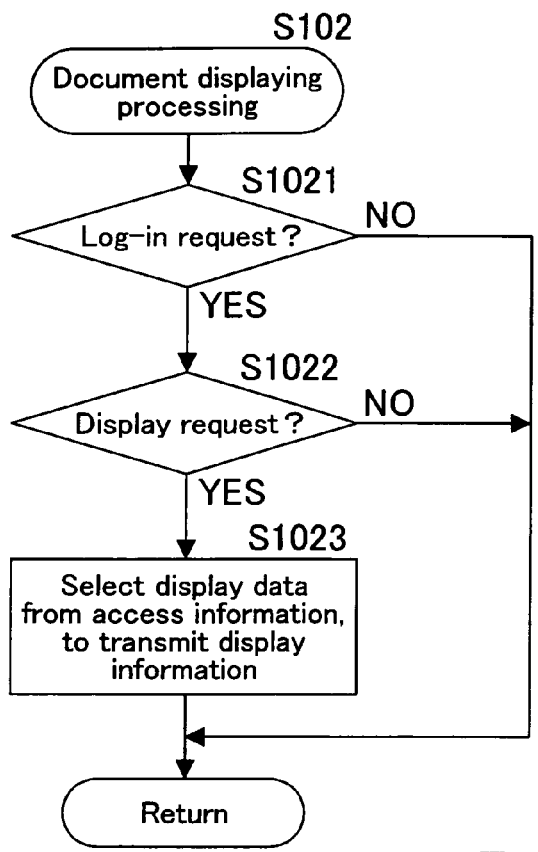
FIG. 5 is a flowchart illustrating a sub-routine of a document displaying processing shown in FIG. 3.

FIG. 5 is a flowchart illustrating a sub-routine of the document displaying processing (S102). This document displaying processing is processing of displaying document data for the purpose of selection with respect to the user who requests the log-in.

In FIG. 5, it is judged in S1021 as to whether or not there is a user who requests log-in at present. If there is a user who requests the log-in (i.e., the judgment in S1021 is YES), it is judged in S1022 as to whether or not the user requests document display. If the user requests the document display (i.e., the judgment in S1022 is YES) in S1023, the document data in accordance with the access condition of the user who requests the log-in, which has been acquired in the authenticating processing in S101, is transmitted to the user who requests the log-in, and then, the routine is returned.

In contrast, if there is no user who requests the log-in (i.e., the judgment in S1021 is NO), the routine is returned without performing any processing. Furthermore, if the user who requests the log-in does not request the document display (i.e., the judgment in S1022 is NO), the routine is returned without performing any processing.

Figure 6:
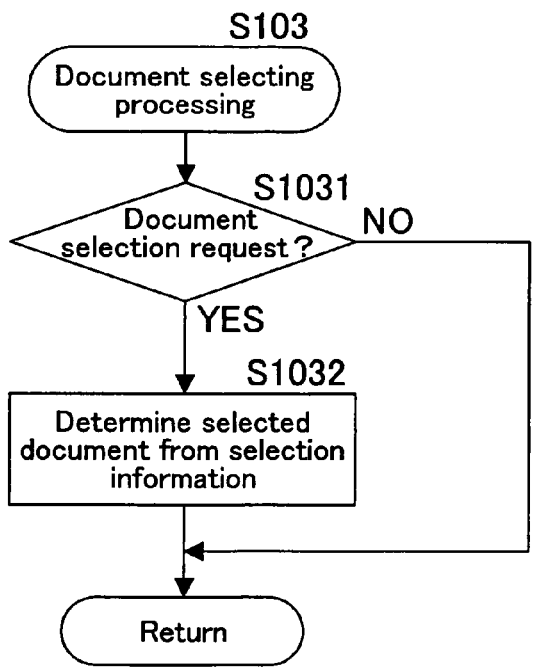
FIG. 6 is a flowchart illustrating a sub-routine of a document selecting processing shown in FIG. 3.

FIG. 6 is a flowchart illustrating a sub-routine of the document selecting processing (S103). In this document selecting processing, the user who requests the log-in selects the document data.

In FIG. 6, it is judged in S1031 as to whether or not the user who requests the log-in requests the selection of the document data from the display data transmitted in the document displaying processing in S102. If there is a request for the selection of the document data (i.e., the judgment in S1031 is YES), the document storage server 22 determines the document data selected by the user who requests the log-in and acquires that document data in S1032. Thereafter, the routine is returned. In contrast, if there is no request for the selection of the document data (i.e., the judgment in S1031 is NO), the routine is returned without performing any processing.

Figure 7:
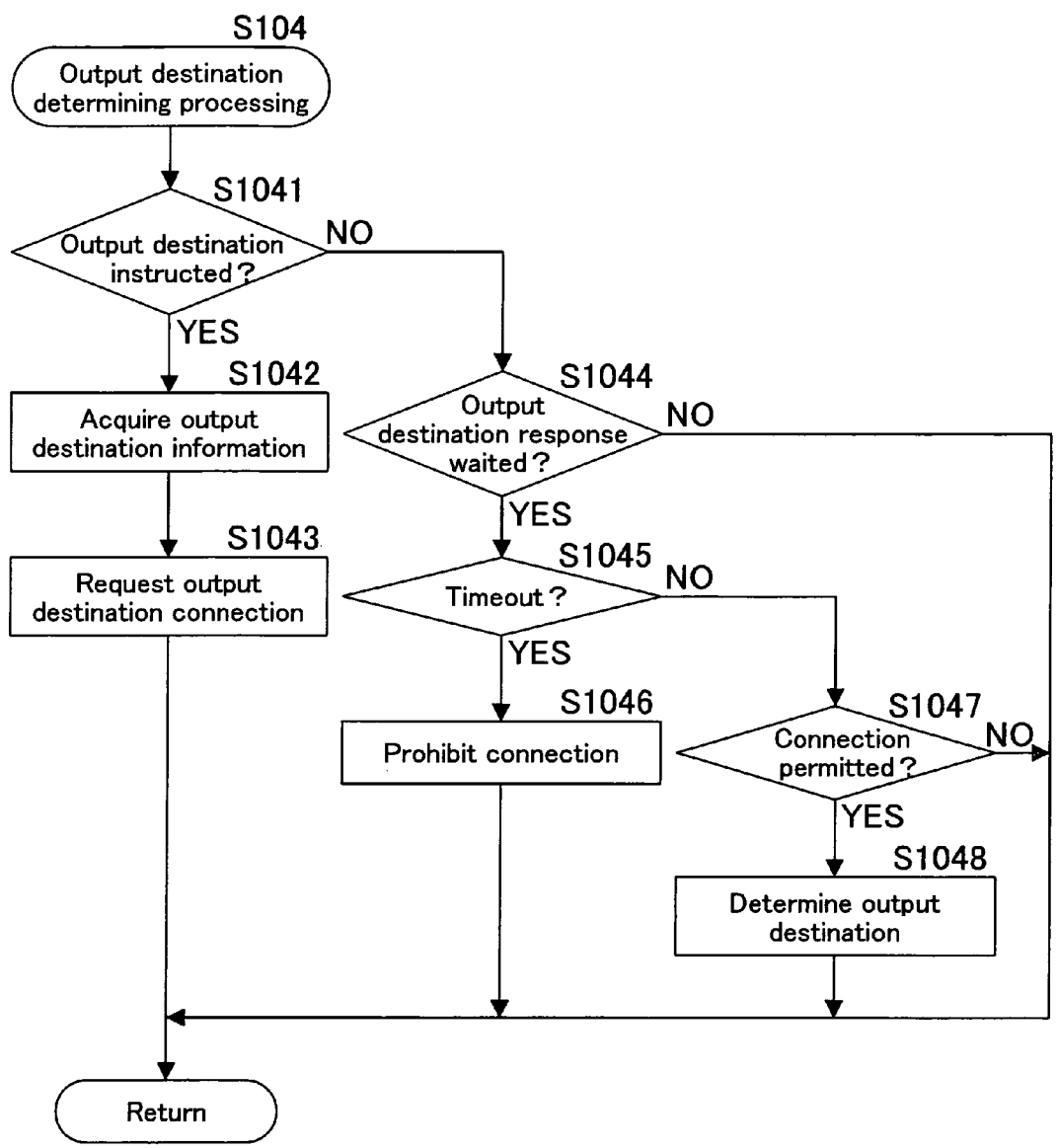
FIG. 7 is a flowchart illustrating a sub-routine of an output destination determining processing shown in FIG. 3.

FIG. 7 is a flowchart illustrating a sub-routine of the output destination determining processing (S104). In this output destination determining processing, the MFP 21 on the network 51 is specified based on output destination information transmitted from the user who requests the log-in.

In FIG. 7, it is judged in S1041 as to whether or not the user who requests the log-in instructs the output destination of the selected document data. If there is an output destination instruction (i.e., the judgment in S1041 is YES), output destination information (e.g., an IP address) is acquired in S1042. In S1043, a connection request is transmitted to the acquired connection destination, and then, the routine is returned.

In contrast, if there is no output destination instruction at present (i.e., the judgment in S1041 is NO), it is judged in S1044 as to whether or not an output destination response is waited. If no output destination response is waited (i.e., the judgment in S1044 is NO), the routine is returned without performing any processing.

In contrast, if an output destination response is waited (i.e., the judgment in S1044 is YES), it is judged in S1045 as to whether or not a timeout occurs. In the case where there is no response from the connection destination after a lapse of a predetermined period of time, that is, the timeout occurs (i.e., the judgment in S1045 is YES), it is determined in S1046 that the connection cannot be carried out, and then, the routine is returned.

In contrast, if no timeout occurs, that is, there is a response from the output destination within the predetermined period of time (i.e., the judgment in S1045 is NO), it is judged in S1047 as to whether or not the connection is permitted. If the connection is permitted (i.e., the judgment in S1047 is YES), the output destination is determined in S1048, and then, the routine is returned. In contrast, if the connection is not permitted (i.e., the judgment in S1047 is NO), the routine is returned without performing any processing.

Figure 8:
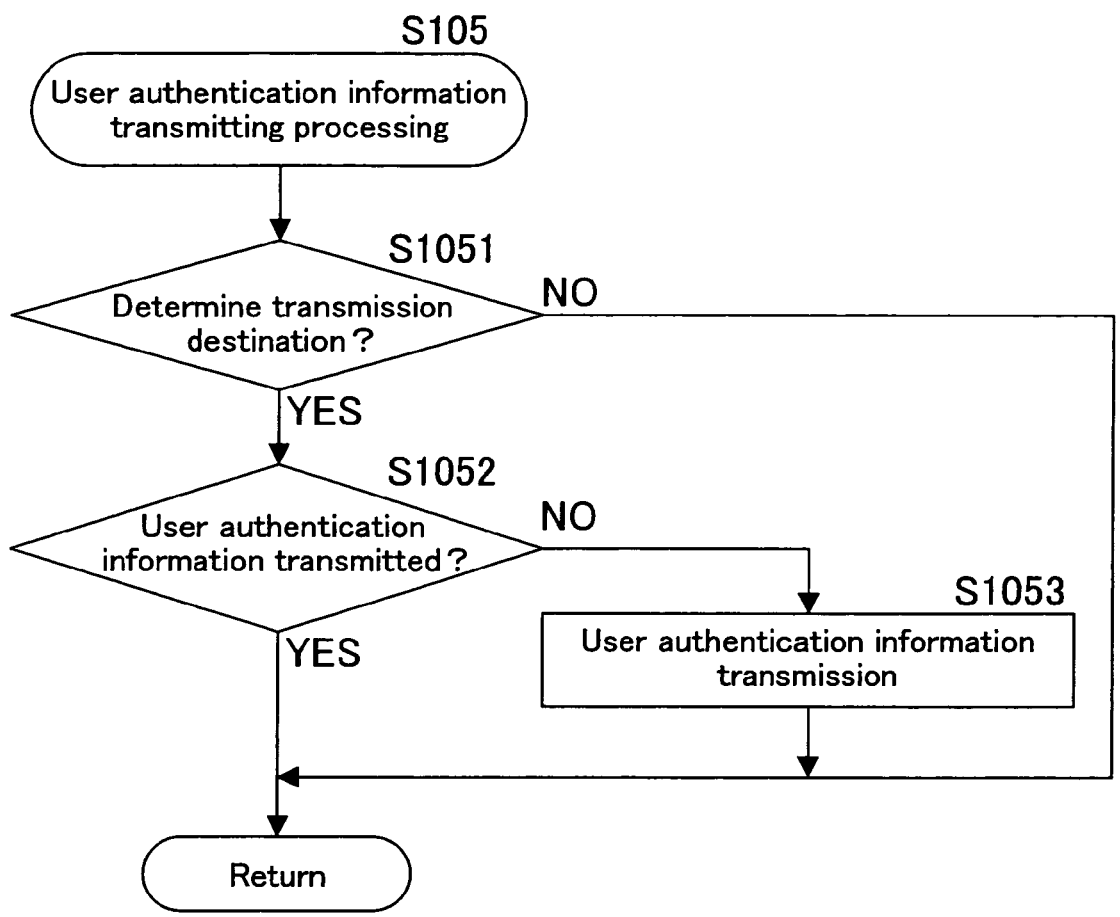
FIG. 8 is a flowchart illustrating a sub-routine of a user authentication information transmitting processing shown in FIG. 3.

FIG. 8 is a flowchart illustrating a sub-routine of the user authentication information transmitting processing (S105). In this user authentication information transmitting processing, the authentication information on the user who logs in with respect to the document storage server 22 is transmitted to the MFP 21 as the output destination.

In FIG. 8, it is judged in S1051 as to whether or not a transmission destination is determined. If the transmission destination is determined (i.e., the judgment in S1051 is YES), it is judged in S1052 as to whether or not the authentication information on the user who logged in has been already transmitted. If the authentication information has been already transmitted (i.e., the judgment in S1052 is YES), the routine is returned without performing any processing.

In contrast, if the authentication information has not been transmitted yet (i.e., the judgment in S1052 is NO), the user authentication information is transmitted to the transmission destination in S1053, and then, the routine is returned. Furthermore, if the transmission destination is not determined (i.e., the judgment in S1051 is NO), the routine is returned without performing any processing.

Figure 9:
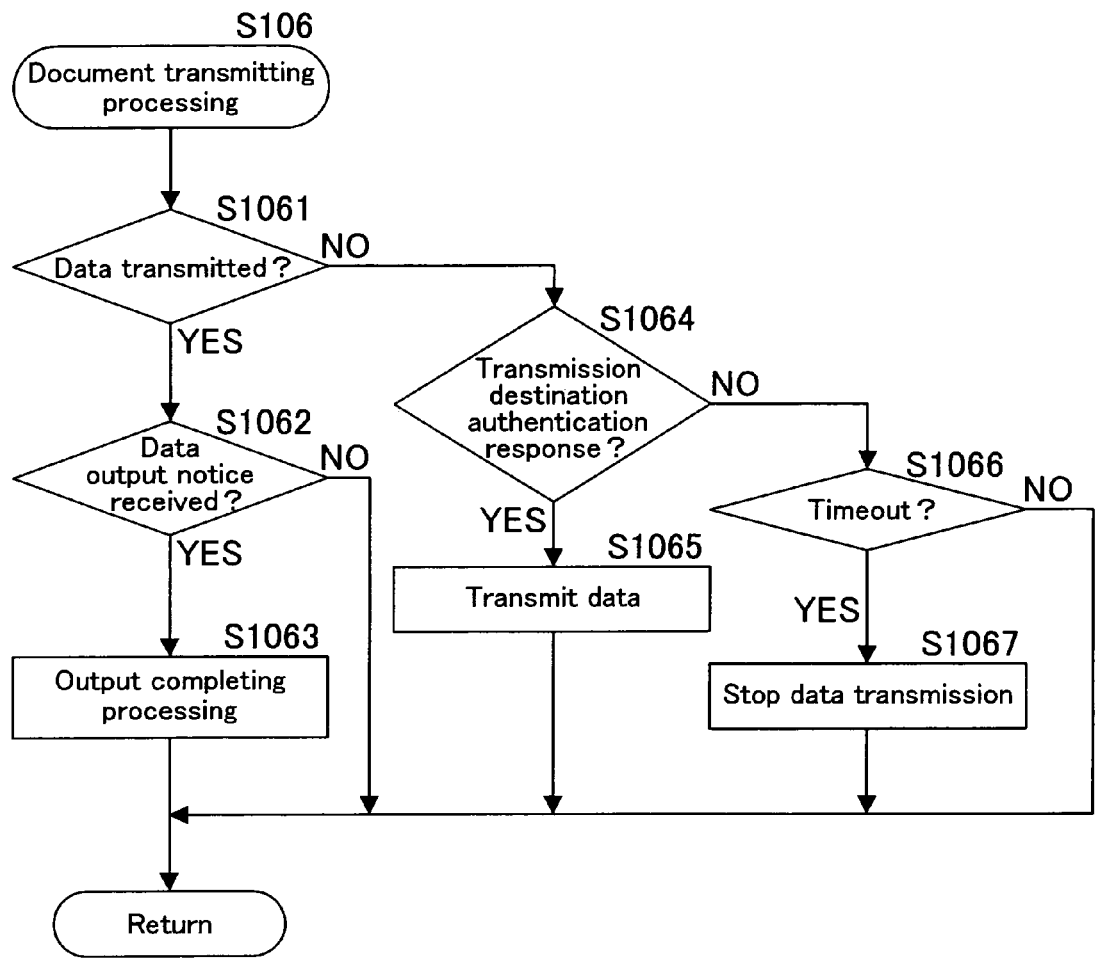
FIG. 9 is a flowchart illustrating a sub-routine of a document transmitting processing shown in FIG. 3.

FIG. 9 is a flowchart illustrating a sub-routine of the document transmitting processing (S106). In this document transmitting processing, the selected document data is transmitted.

In FIG. 9, it is judged in S1061 as to whether or not the selected document data has-been already transmitted to the output destination. If the document data has been already transmitted (i.e., the judgment in S1061 is YES), it is judged in S1062 as to whether or not "a notice which notifies that the document data has been output" is delivered (i.e., received) from the output destination. If the notice is delivered (i.e., the judgment in S1062 is YES), an output completing processing is performed in S1063, and then, the routine is returned. In contrast, if the notice has not been delivered yet (i.e., the judgment in S1062 is NO), the routine is returned without performing any processing.

In contrast, if the document data has not been transmitted yet (i.e., the judgment in S1061 is NO), it is judged in S1064 as to whether or not the output destination responds to the user authentication information transmitted in the user authentication information transmitting processing in S105. If there is a response (i.e., the judgment in S1064 is YES), the document data selected by the user is transmitted in S1065, and then, the routine is returned.

If there is no response (i.e., the judgment in S1064 is NO), it is judged in S1066 as to whether or not the timeout occurs at present. If no timeout occurs (i.e., the judgment in S1066 is NO), the routine is returned without performing any processing. In contrast, if the timeout occurs (i.e., the judgment in S1066 is YES), the transmission of the document data is stopped in S1067, and then, the routine is returned.

Figure 10:
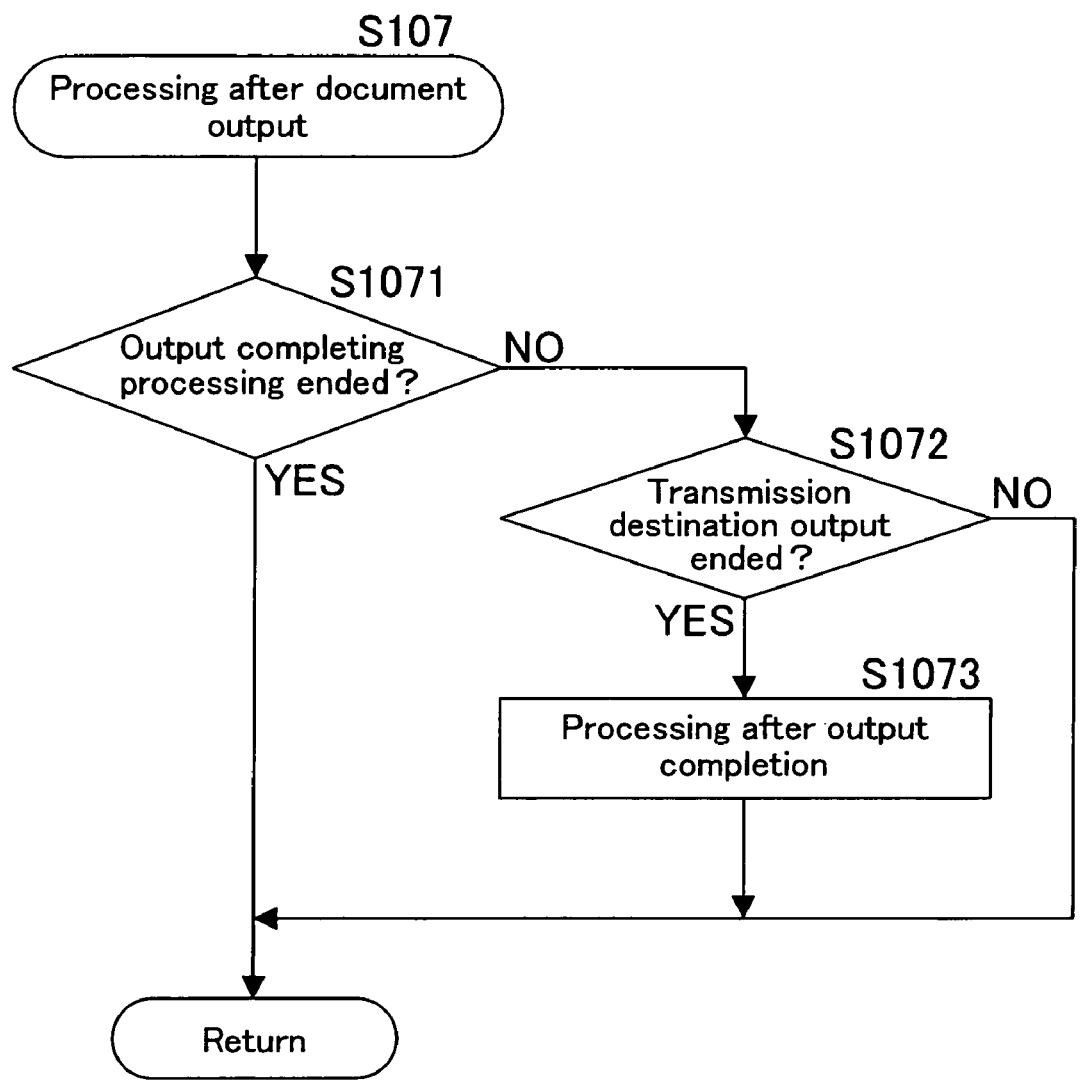
FIG. 10 is a flowchart illustrating a sub-routine of processing after a document is output, shown in FIG. 3.

FIG. 10 is a flowchart illustrating a sub-routine of processing after the document output (S107). In this processing after the document output, post-processing in association with a data output such as the billing is performed in accordance with the output information acquired from the output destination.

In FIG. 10, it is judged in S1071 as to whether or not processing after data output completion has been ended already. If the processing after the data output completion has been ended already (i.e., the judgment in S1071 is YES), the routine is returned without performing any processing.

In contrast, if the processing after the data output completion has not been ended yet (i.e., the judgment in S1071 is NO), it is judged in S1072 as to whether or not an output completion notice is delivered from the data transmission destination. If the notice is delivered (i.e., the judgment in S1072 is YES), the processing after the data output completion is executed in S1073, and then, the routine is returned. In contrast, if no notice is delivered (i.e., the judgment in S1072 is NO), the routine is returned without performing any processing.

Next, a description will be given below of the processing in the MFP 21 as the output destination of the document data in reference to a flowchart shown in FIG. 11.

Figure 11:
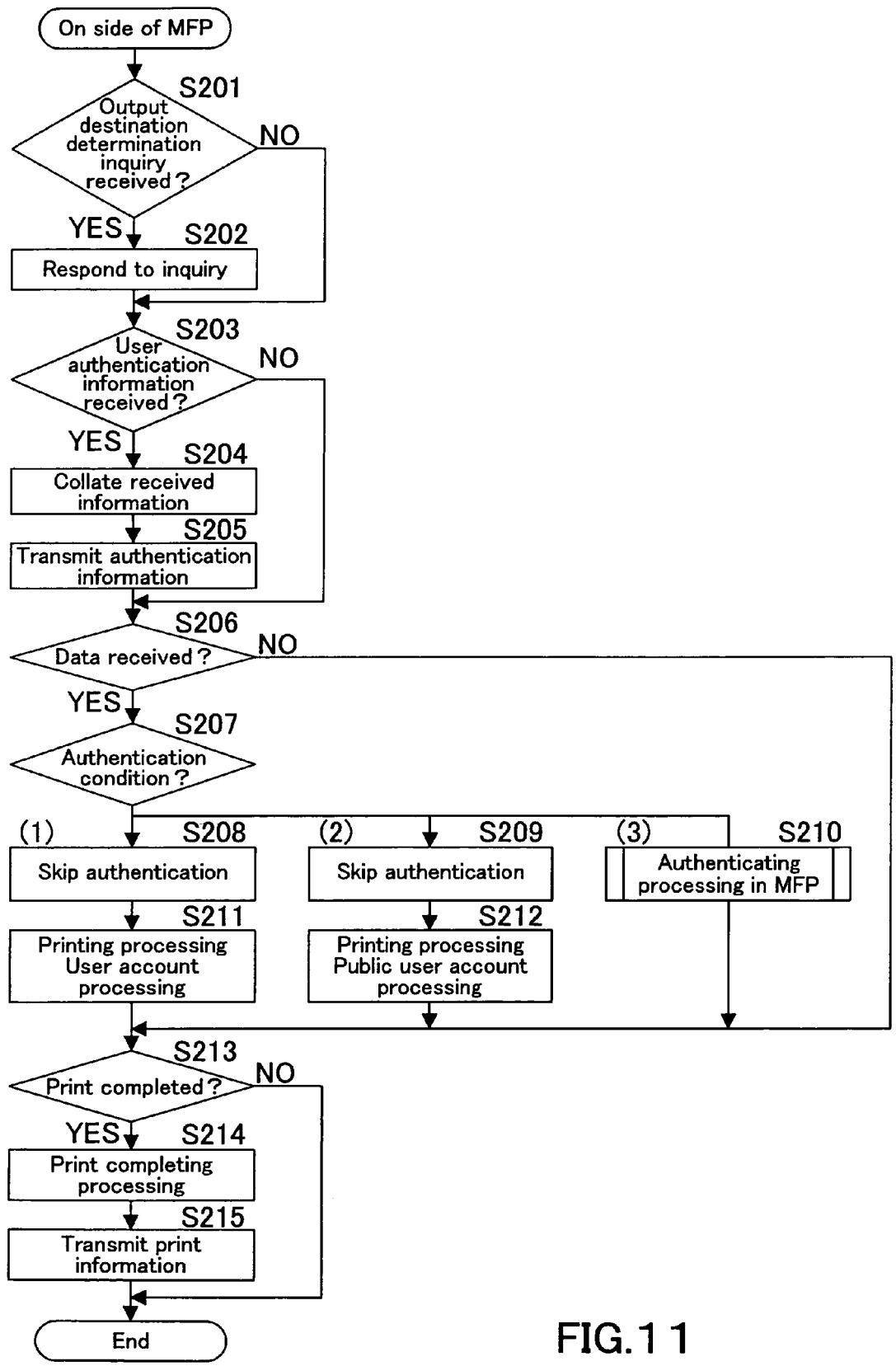
FIG. 11 is a flowchart illustrating processing to be executed by an image processing apparatus (i.e., the MFP)

In FIG. 11, it is judged in S201 as to whether or not there is an inquiry for determining the output destination from the document storage server 22 in the MFP 21. If there is an inquiry (i.e., the judgment in S201 is YES), a reply, for example, "an MFP which can output the data from the document storage server 22" is sent with respect to the inquiry in S202, the routine proceeds to S203. In contrast, if there is no inquiry (i.e., the judgment in S201 is NO), the routine proceeds to S203 without performing any processing.

In S203, it is judged as to whether or not the authentication information on the user who requests the data output is received from the document storage server 22. If the user authentication information is received (i.e., the judgment in S203 is YES), the user account information stored in the MFP 21 is collated with the authentication information from the document storage server 22 in S204. Thereafter, the collation result is transmitted to the document storage server 22 in S205, and then, the routine proceeds to S206. If no user authentication information is received (i.e., the judgment in S203 is NO), the routine proceeds to S206.

In S206, it is judged as to whether or not the document data is received from the document storage server 22. If the document data is received (i.e., the judgment in S206 is YES), the authentication condition on the user who requests the output is judged in S207. As a result, the routine proceeds to any one of processing, described below. In contrast, if no document data is received (i.e., the judgment in S206 is NO), the routine proceeds to S213.

(1) The case where the user is authenticated by the document storage server 22 and the user account exists as account data stored in the MFP 21.

(2) The case where the user is authenticated by the document storage server 22 and no user account exists as account data stored in the MFP 21.

(3) The case where the document storage server 22 has no authenticating function or the user logs in as a guest user or an anonymous user even if the document storage server 22 has the authenticating function, wherein the guest user signifies a specified user whom "an owner" having all of control access authorities with respect to the MFP 21 gives an access authority, and further, the anonymous user signifies a user who is not the guest user but whom "the owner" gives an access authority.

The routine proceeds to S208 in the case (1). The authentication in the MFP 21 is skipped, and thereafter, the printing operation is performed in accordance with the user account stored in the MFP 21 in S211.

The routine proceeds to S209 in the case (2). The authentication in the MFP 21 is skipped, and thereafter, the printing operation is performed in accordance with a public user account in S212. Incidentally, in this case, the processing function by the MFP 21 is restricted (for example, the number of printed sheets is 10 or less) in comparison with the case in S211 since security is degraded.

The routine proceeds to S210 in the case (3). The authenticating processing with respect to the user who requests the log-in is performed on the operation panel 39 in the MFP 21. This authenticating processing will be described later.

Subsequently, it is judged in S213 as to whether or not the printing operation is completed. If the printing operation is completed (i.e., the judgment in S213 is YES), a print completing processing is performed in S214 for acquiring information on printing conditions and the number of printed sheets, and thereafter, the acquired print information is transmitted to the document storage server 22 in S215, thereby leading to an end. In contrast, if the printing operation is being performed or the print completing processing is finished (i.e., the judgment in S213 is NO), the routine comes to an end without performing any processing.

Figure 12:
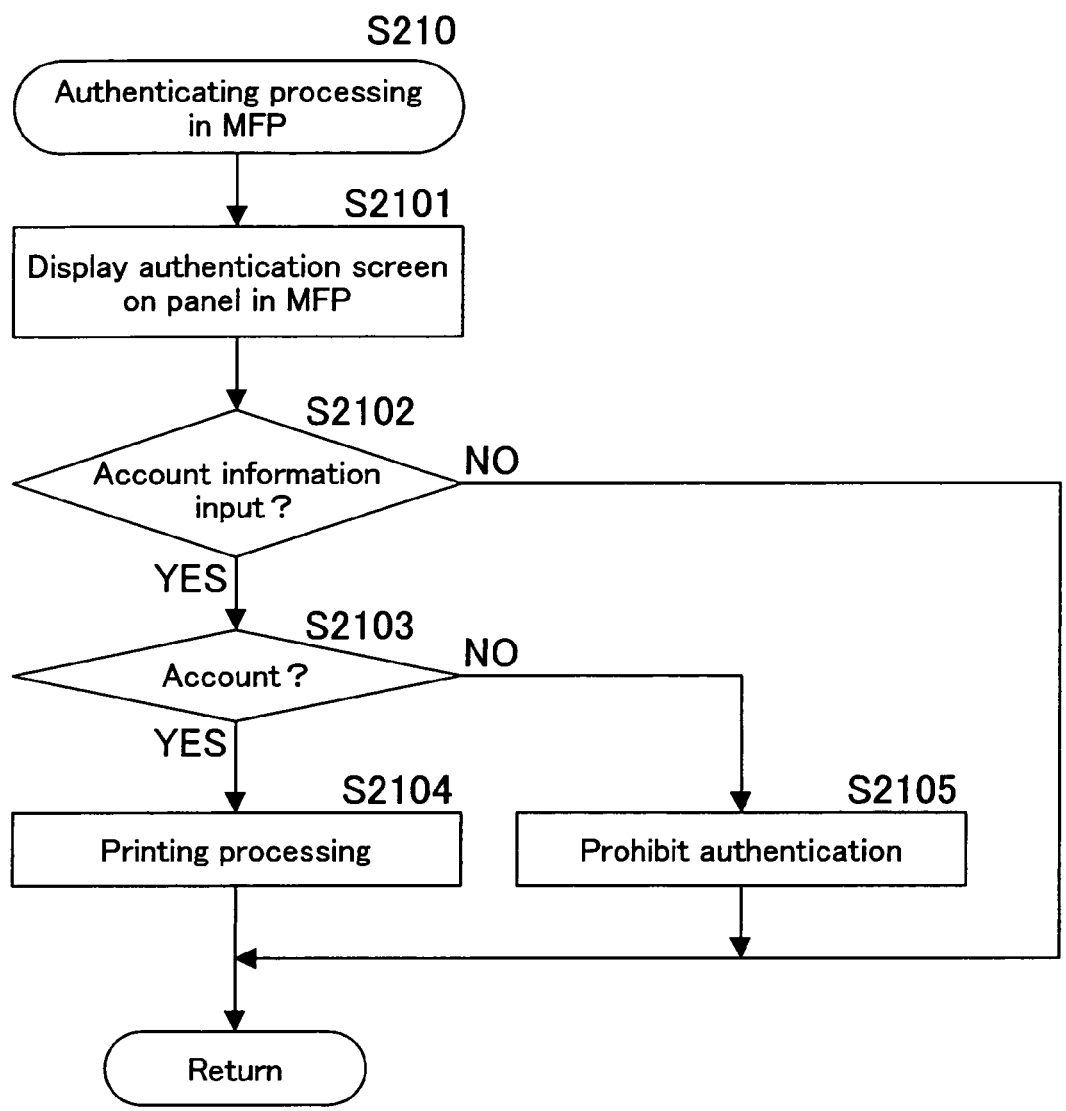
FIG. 12 is a flowchart illustrating a sub-routine of an authenticating processing to be executed by the MFP shown in FIG. 11.

FIG. 12 is a flowchart illustrating a sub-routine of the authenticating processing to be executed by the MFP 21 (S210 shown in FIG. 11).

In FIG. 12, an authentication screen is displayed on the operation panel 39 in the MFP 21 in S2101. Thereafter, it is judged in S2102 as to whether or not the account information is input. If the account information is input (i.e., the judgment in S2102 is YES), the routine proceeds to S2103. In contrast, if no account information is input (i.e., the judgment in S2102 is NO), the routine is returned without performing any processing.

It is judged in S2103 as to whether or not there is an account in the MFP 21. If there is an account in the MFP 21 (i.e., the judgment in S2103 is YES), the printing operation is performed in S2104, and then, the routine is returned. Also in this case, the number of printed sheets may be restricted. In contrast, if there is no account in the MFP 21 (i.e., the judgment in S2103 is NO), the authentication is prohibited in S2105, and then, the routine is returned.

As is clear from the above description, another authentication is skipped on the side of the MFP 21 in the case where the user is authenticated on the side of the document storage server 22. As a consequence, the user need not input the user ID or the like again for the purpose of the authentication on the side of the MFP 21, thus simplifying the operation.

[Simultaneous Transmission of Document Data and Authentication Information from Document Storage Server 22 to MFP 21]

Processing on the side of the document storage server 22 in this case will be described below in reference to a flowchart shown in FIG. 13.

Figure 13:
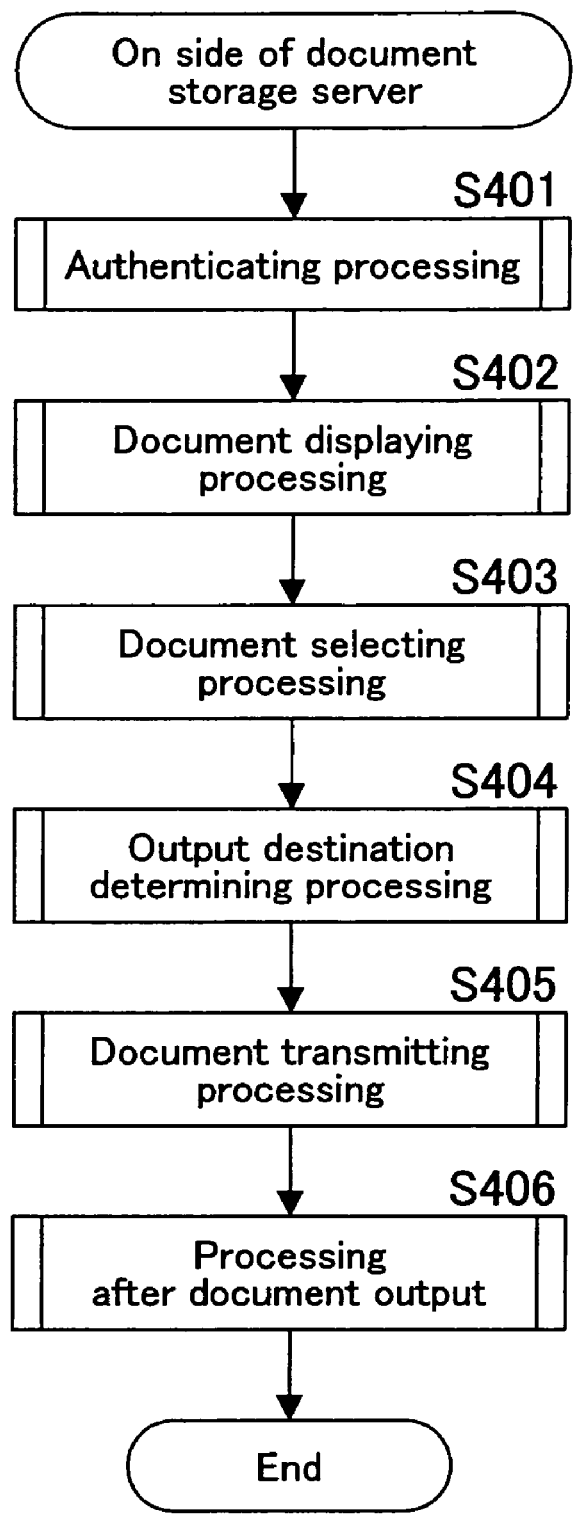
FIG. 13 is a flowchart illustrating processing to be executed by the document storage server in the case where the document data and the authentication information are transmitted together with each other.

As shown in FIG. 13, the routine is ended after an authenticating processing in S401, a document displaying processing in S402, a document selecting processing in S403, an output destination determining processing in S404, a document transmitting processing in S405 and processing after document output in S406.

Here, the contents of each of the authenticating processing in S401, the document displaying processing in S402, the document selecting processing in S403, the output destination determining processing in S404 and the processing after the document output in S406 are the same as those of each of the authenticating processing in S101, the document displaying processing in S102, the document selecting processing in S103, the output destination determining processing in S104 and the processing after the document output in S107 shown in FIG. 3, respectively. Therefore, the explanation on each of the contents will be omitted below.

As is obvious from the comparison between the flowcharts shown in FIGS. 3 and 13, the user authentication information transmitting processing in S105 shown in FIG. 3 can be omitted in the case of simultaneous transmission of first authentication information and document data. The authentication result is received together with the received document data in the MFP 21.

Figure 14:
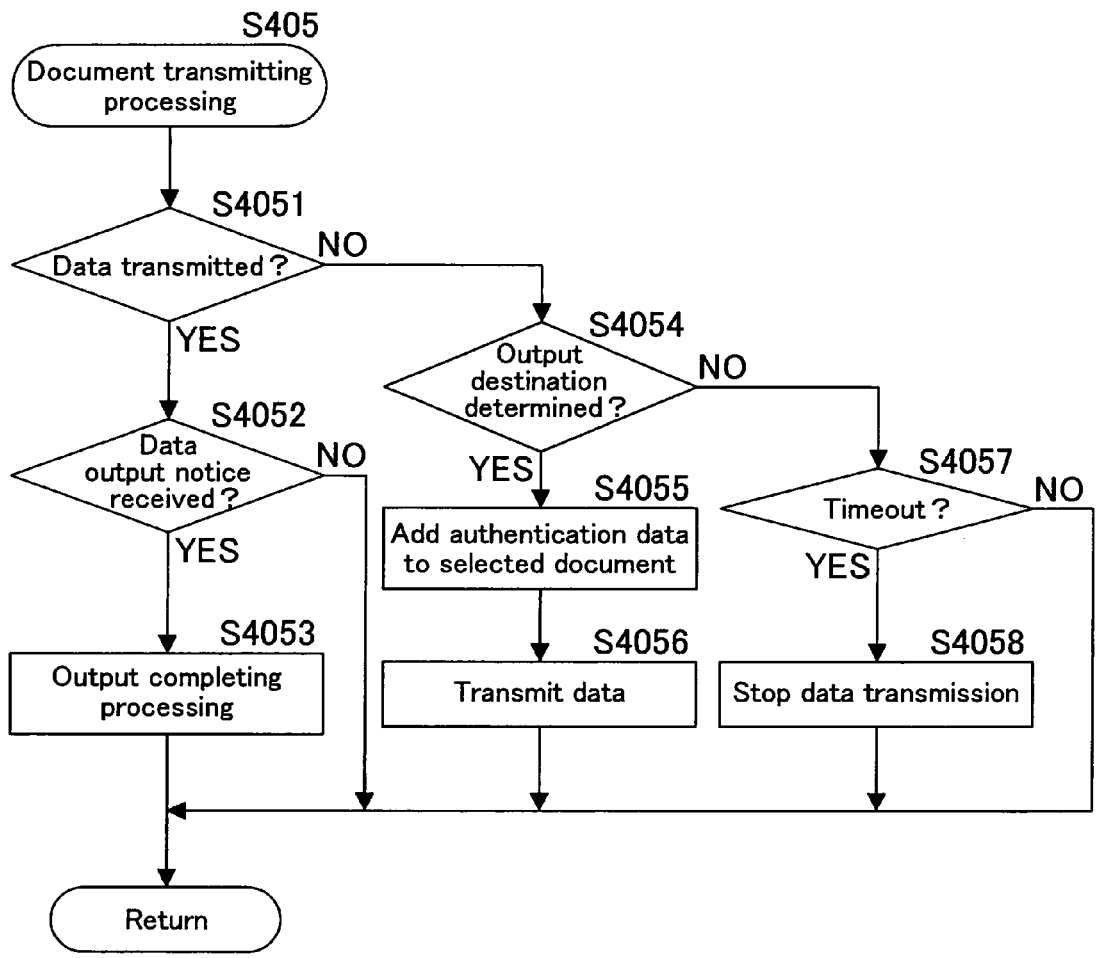
FIG. 14 is a flowchart illustrating a sub-routine of a document transmitting processing shown in FIG. 13.

FIG. 14 is a flowchart illustrating a sub-routine of the document transmitting processing (S405). In the document transmitting processing, a selected document is transmitted.

In FIG. 14, it is judged in S4051 as to whether or not the selected document data has been already transmitted to the output destination. If the document data has been already transmitted (i.e., the judgment in S4051 is YES), it is judged in S4052 as to whether or not "a notice which notifies that the document data has been output" is delivered (i.e., received) from the output destination. If the notice is delivered (i.e., the judgment in S4052 is YES), an output completing processing is performed in S4053, and then, the routine is returned. In contrast, if no notice is delivered (i.e., the judgment in S4052 is NO), the routine is returned without performing any processing.

In contrast, if the document data has not been transmitted yet (i.e., the judgment in S4051 is NO), it is judged in S4054 as to whether or not the output destination is determined. If the output destination is determined (i.e., the judgment in S4054 is YES), the selected document data is added with authentication data in S4055. Thereafter, the data are transmitted in S4056, and then, the routine is returned.

In contrast, if the output destination is not determined (i.e., the judgment in S4054 is NO), it is judged in S4057 as to whether or not the timeout occurs at present. If no timeout occurs (i.e., the judgment in S4057 is NO), the routine is returned without performing any processing. In contrast, if the timeout occurs (i.e., the judgment in S4057 is YES), the transmission of the data is stopped in S4057, and then, the control routine is returned.

In this manner, the authentication data can be transmitted in addition to the document data.

Next, processing in the MFP 21 as the output destination of the document data will be described below in reference to a flowchart shown in FIG. 15.

Figure 15:
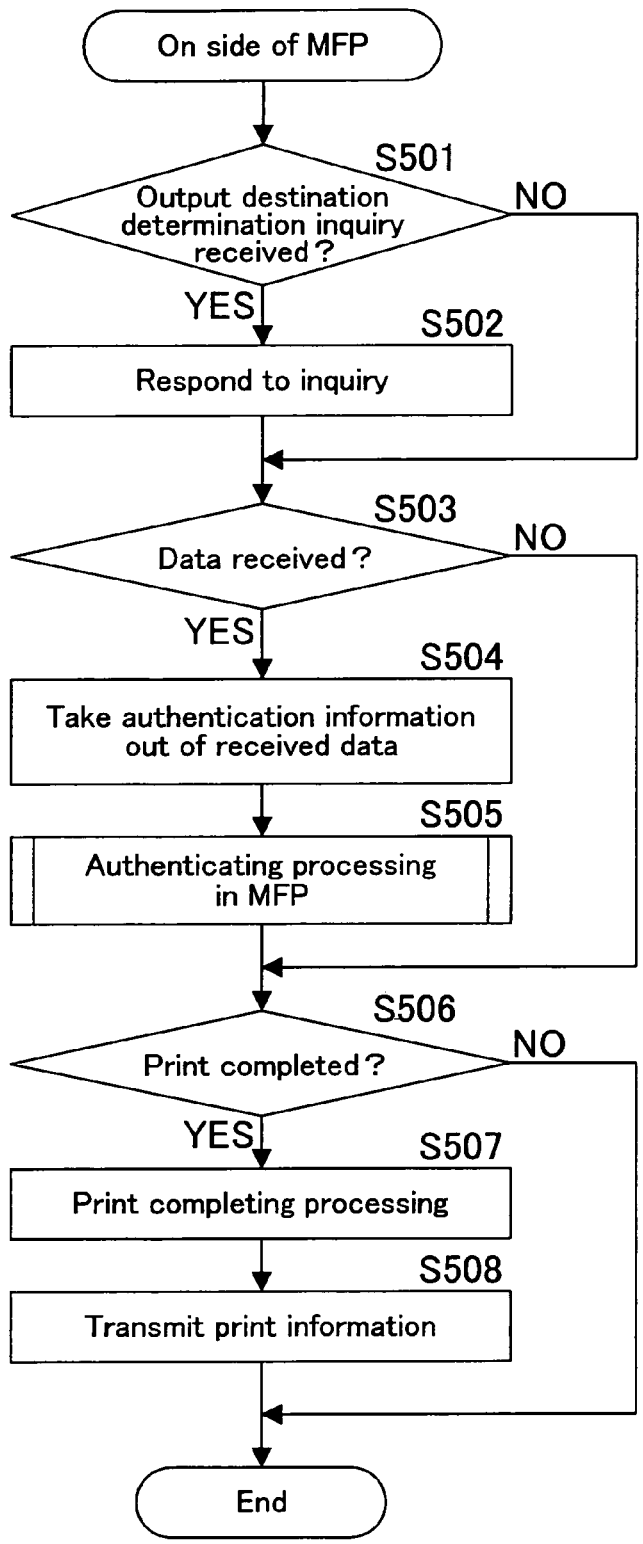
FIG. 15 is a flowchart illustrating processing on the side of the image processing apparatus (i.e., the MFP)

In FIG. 15, it is judged in S501 as to whether or not there is an inquiry for determining the output destination from the document storage server 22 in the MFP 21. If there is an inquiry (i.e., the judgment in S501 is YES), a reply, for example, "an MFP which can output the data from the document storage server 22" is sent with respect to the inquiry in S502, the routine proceeds to S503. In contrast, if there is no inquiry, the routine proceeds to S503 without performing any processing.

In S503, it is judged as to whether or not the document data added with the authentication data is received from the document storage server 22. If the document data is received (i.e., the judgment in S503 is YES), the authentication information is taken out of the received data in S504. Thereafter, the authenticating processing is performed in S505, and then, the routine proceeds to S506. The authenticating processing will be described later. If the document data is not received (i.e., the judgment in S503 is NO), the routine proceeds to S506 without performing any processing.

It is judged in S506 as to whether or not the printing operation is completed. If the printing operation is completed (i.e., the judgment in S506 is YES), a print completing processing is performed in S507 for acquiring information on printing conditions and the number of printed sheets.

Thereafter, the acquired print information is transmitted to the document storage server 22 in S508, thereby leading to an end. In contrast, if the printing operation is being performed or the print completing processing is finished (i.e., the judgment in S506 is NO), the routine comes to an end without performing any processing.

Figure 16:
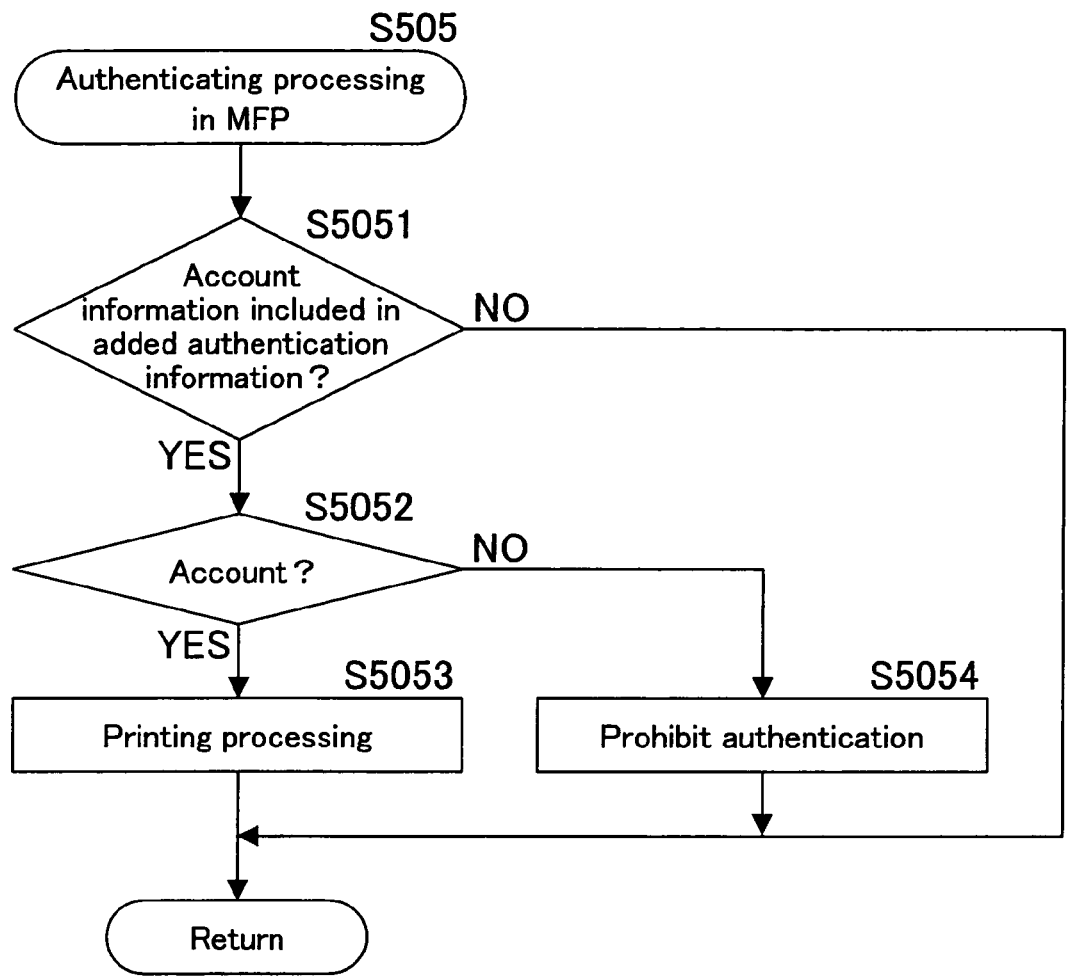
FIG. 16 is a flowchart illustrating a sub-routine of an authenticating processing to be executed by the MFP shown in FIG. 15.

FIG. 16 is a flowchart illustrating a sub-routine of the authenticating processing to be executed by the MFP 21 (S505 shown in FIG. 15).

In FIG. 16, it is judged in S5101 as to whether or not the authentication information added to the document data includes account information. If the authentication information includes the account information (i.e., the judgment in S5051 is YES), the routine proceeds to S5052. In contrast, if the authentication information includes no account information (i.e., the judgment in S5051 is NO), the routine is returned without performing any processing.

It is judged in S5052 as to whether or not there is an account in the MFP 21. If there is an account in the MFP 21 (i.e., the judgment in S5052 is YES), the printing operation is performed in S5053, and then, the routine is returned. In contrast, if there is no account in the MFP 21 (i.e., the judgment in S5052 is NO), the authentication is prohibited in S5054, and then, the routine is returned.

As described above, also in the case where the authentication information and the document data are transmitted together with each other by adding the authentication information to the document data, when the added authentication information includes the account information, which is stored also in the MFP 21, the user can use the function of the MFP 1 even without another authentication on the side of the MFP 21.

Next, explanation will be made below on another preferred embodiment according to the invention. In the present preferred embodiment, another authentication is omitted during usage of an MFP 21 on a PC 50 serving as a user terminal based on authentication information input by a user when an application program is started (i.e., used).

Figure 17:
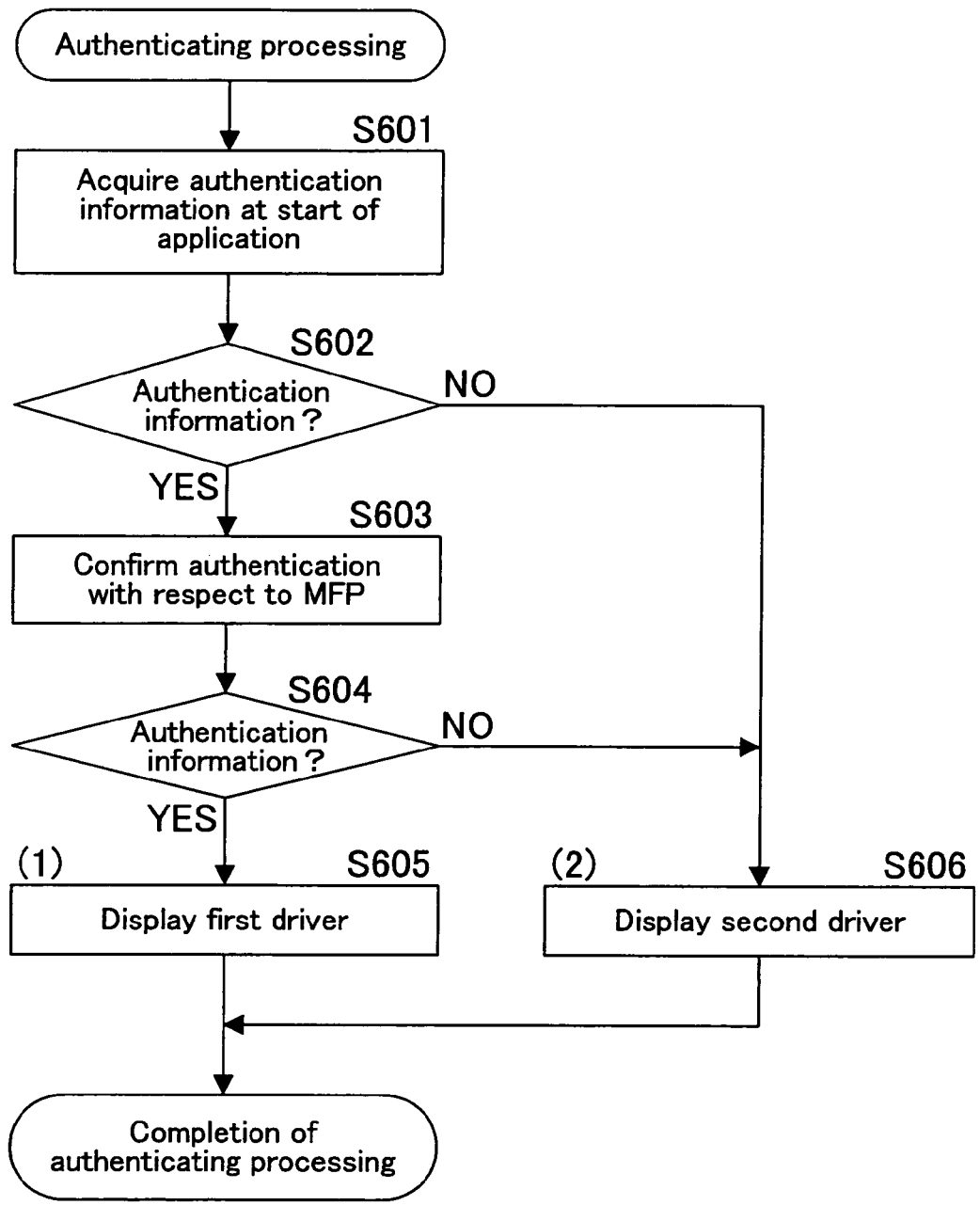
FIG. 17 is a flowchart illustrating an authenticating processing to be executed by a printer driver at a printing request for an MFP by the use of an application program.

FIG. 17 illustrates a flow of processing.

A printer driver installed in the PC 50 executes an authenticating processing shown in FIG. 17 as one of processing at a request of a printing operation in accordance with the application program. This authenticating processing is executed upon depressing an "OK" button 392 on a printing mode setting screen 391 of the printer driver shown in FIG. 18.

In FIG. 17, the printer driver acquires, in S601, the authentication information input at the start of the application program by the user in accordance with the application program which has been instructed to perform the printing operation. It is judged in S602 as to whether or not the authentication information is acquired from the application program. If the authentication information is acquired (i.e., the judgment in S602 is YES), the authentication information is inquired (i.e., the authentication is confirmed) with respect to the MFP 21 in S603.

Subsequently, it is judged in S604 as to whether or not there is authentication information from the MFP 21. If there is authentication information (i.e., the judgment in S604 is YES), the processing is branched.

Figure 19:
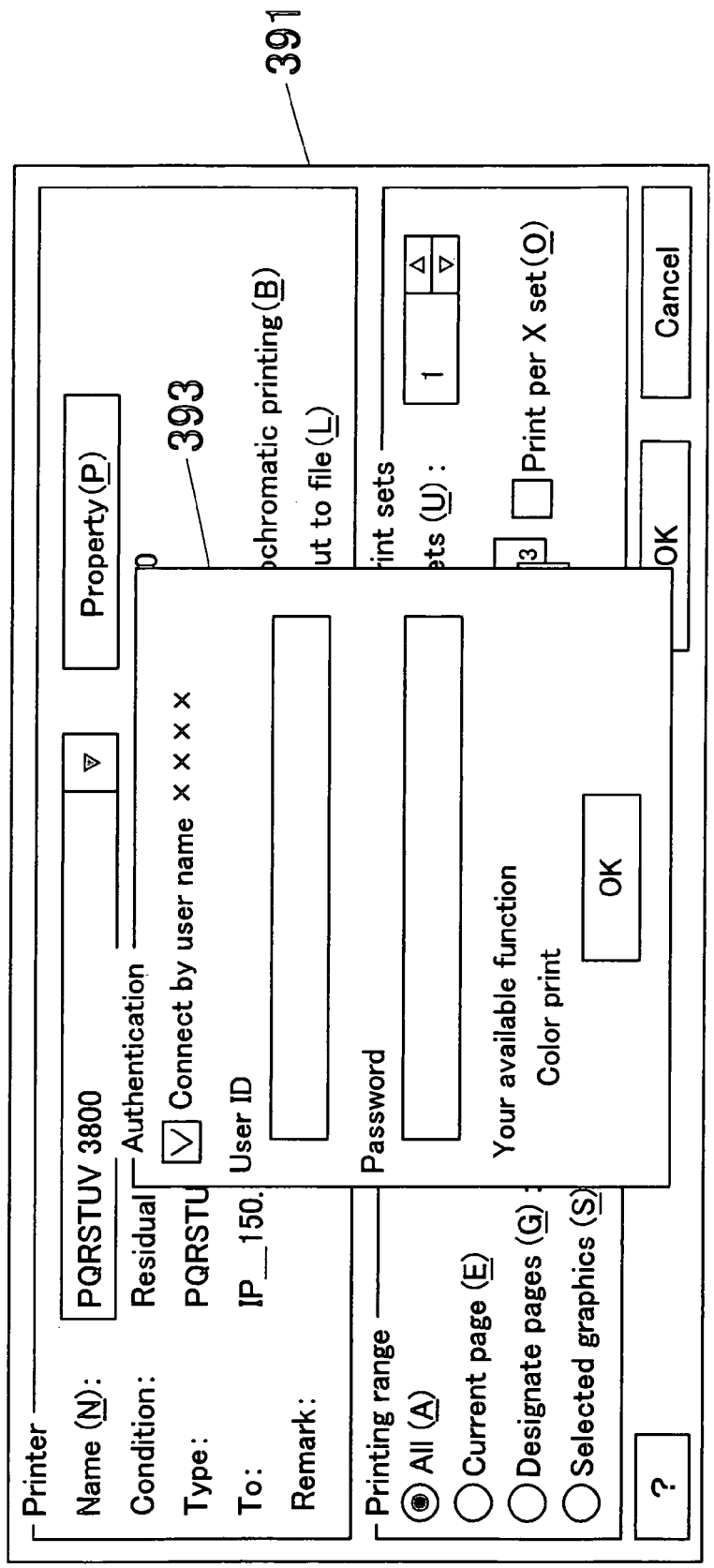
FIG. 19 is a diagram illustrating a first driver display screen.

(1) The case where the authentication information acquired in accordance with the application program is included in an account stored in the MFP 21:

In this case, a first driver display having an authentication screen 393 shown in FIG. 19 is displayed in S605. As shown, on the screen are displayed connection in accordance with an account acquired based on the application program and the function of the MFP 21 which can be used in accordance with this account. If the user satisfies the displayed account, he or she merely executes a next processing. In contrast, if the user requires connection in accordance with another account because of the function restriction of the MFP 21, a mark in a check box shown in FIG. 19 may be cleared such that another account is input.

Figure 20:
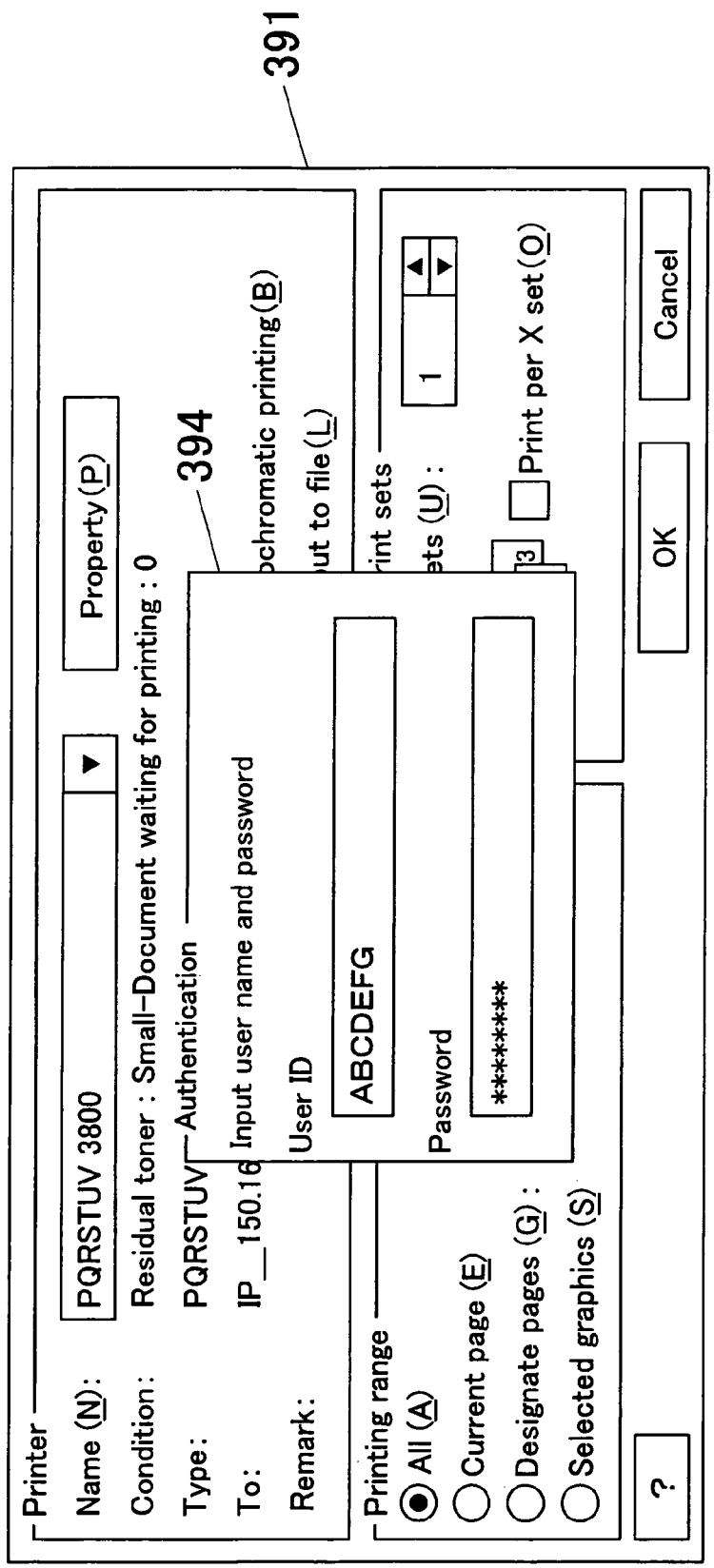
FIG. 20 is a diagram illustrating a second driver display screen.

(2) The case where the authentication information acquired in accordance with the application program is not included in the account stored in MFP 21:

If it is judged that the authentication information cannot be taken out of the application program (i.e., the judgment in S602 is NO) or if there is no authentication information from the MFP 21 (i.e., the judgment in S604 is NO), a second driver display having an authentication screen 394 shown in FIG. 20 is displayed in S606, thereby promoting an account input.

Also in the present preferred embodiment, another inputting operation of the user ID or password can be omitted during the usage of the MFP 21 by using the authentication information obtained when the application program is started, thus enhancing operability.

Although the preferred embodiments according to the invention have been described above, the invention is not limited to those preferred embodiments. For example, the invention encompasses the following preferred embodiments:

(1) The first preferred embodiment has been exemplified by that a second log-in can be omitted in the MFP 21 when the document storage server 22 is first logged in, the document is selected from the document storage server 22, and then, the transmission to the MFP 21 leads to the printing operation. However, the log-in in the document storage server 22 may be omitted in the case where the MFP 21 is first logged in, the document is scanned, and finally, the scanned document is transmitted to and stored in the document storage server 22. It is to be understood that the document to be transmitted from the MFP 21 should be not only the scanned document but also a document stored in a box in advance.

(2) The second preferred embodiment has been exemplified by that the file created in accordance with the application program in the host PC 50 is transmitted to the MFP 21, to be then printed. However, the log-in in the MFP 21 may be omitted in the case where the file created in the host PC 50 is transmitted to the MFP 21, to be then transmitted to the outside from the MFP 21 via a FAX by the use of a PC-FAX function. Furthermore, the processing in the MFP 21 is not limited to this. For example, a document stored in a box in the MFP 21 in advance may be coupled to an application file, or the application file created in the PC 50 may be converted by using a file format converting function or a compressing function possessed by the MFP 21.

Moreover, in the above-described preferred embodiments, the MFP 21 serving as a multi-functional image forming apparatus is used as the image processing apparatus. However, the image processing apparatus may be a printer having only a printing function or a router.

In addition, the document storage server 22 has functioned as a document storage apparatus in the preferred embodiment shown in FIG. 1. However, in the case where the image forming apparatus such as the MFP is used as a document processing apparatus such that document data is transmitted or received between the MFPs, an authenticating operation of at least one of first authenticator and second authenticator may be controlled based on an authentication result of the other authenticator.

Figure 21:
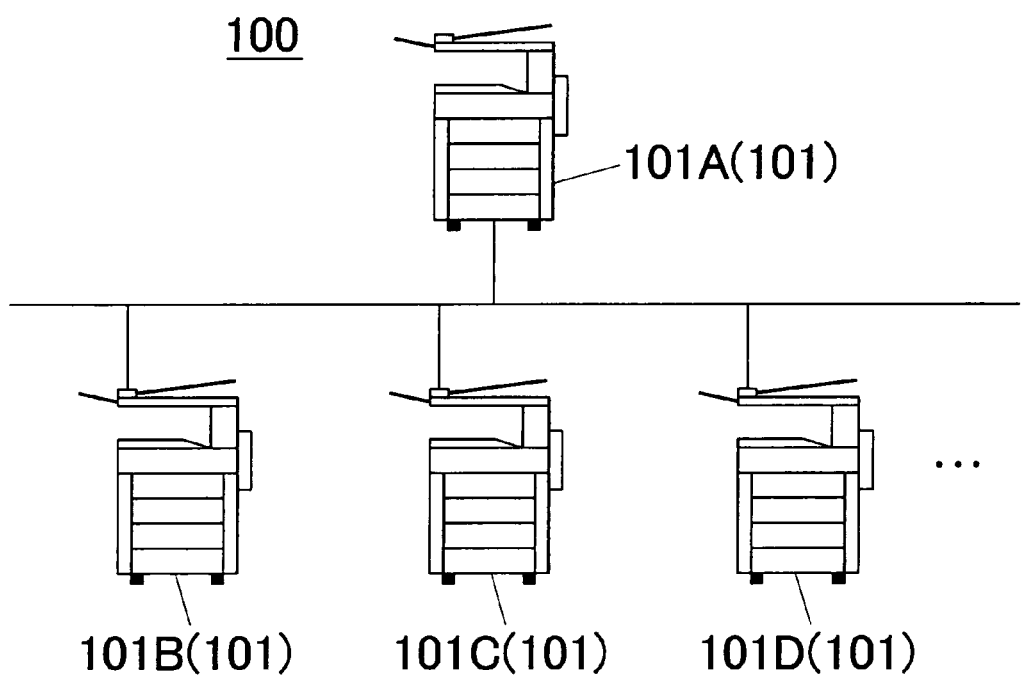
FIG. 21 is a diagram illustrating a general arrangement of an image processing system, in which MFPs are used.
Figure 22:
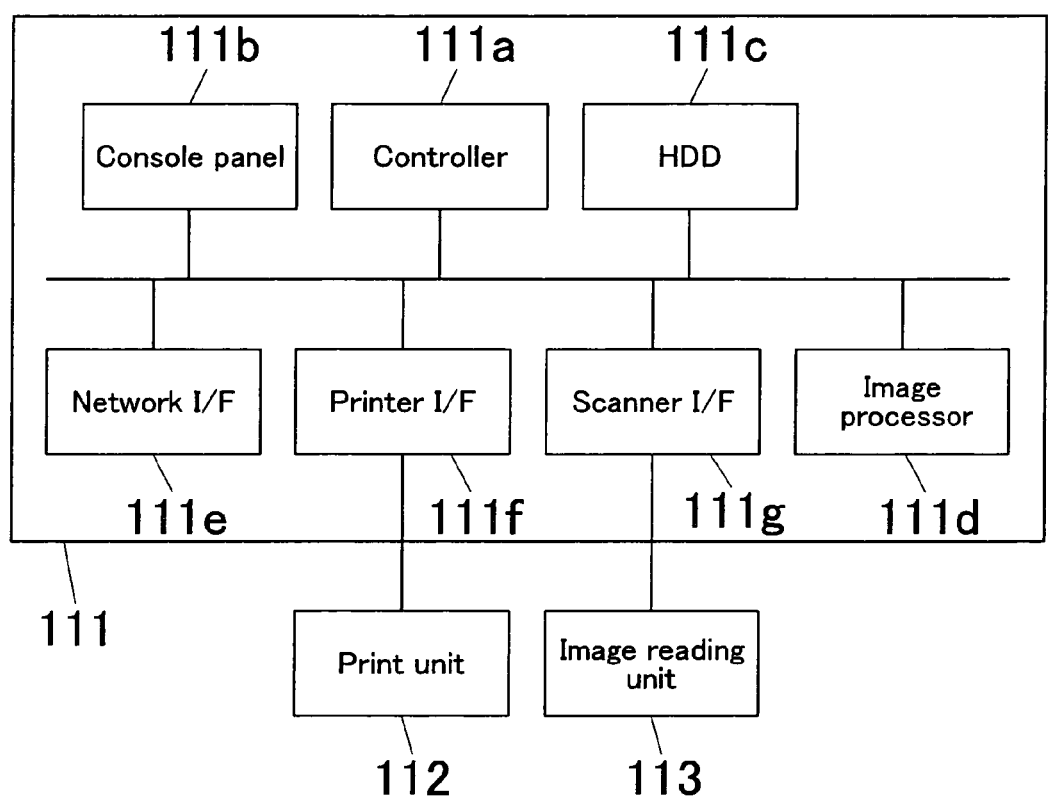
FIG. 22 is a diagram illustrating an example of a hardware configuration of the MFP used in FIG. 21.
Figure 23:
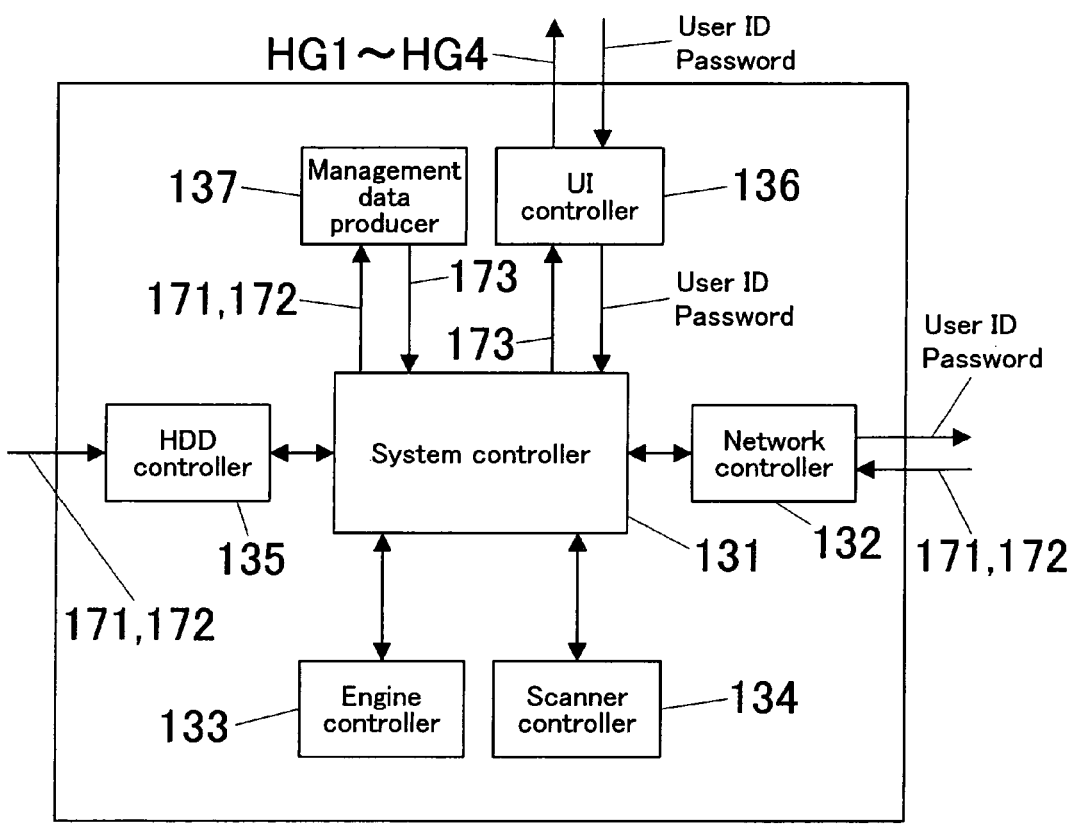
FIG. 23 is a diagram illustrating an example of a functional configuration of the MFP used in FIG. 21.

FIG. 21 is a diagram illustrating a general arrangement of an image processing system, in which MFPs 101 as described above are used; FIG. 22 is a diagram illustrating an example of a hardware configuration of the MFP 101; and FIG. 23 is a diagram illustrating an example of a functional configuration of the MFP 101.

As shown in FIG. 1, an image processing system 100 is constituted of a plurality of MFPs 101 (101A, 101B, 101C . . . ), a communication line 102 and the like. Examples of the communication line 102 include a LAN, the Internet, a special line and a public line. These MFPs 101 are connected to each other via the communication line 102.

Each of the MFPs 101 is constituted of a control unit 111, a print unit 112, an image reading unit 113 and the like, as shown in FIG. 22. The MFP 101 comprehensively has the functions of a copying machine, a printer, a scanner, a FAX, a document server, and the like.

"The document server" functions to give a personal box to each of users or groups, so as to store and manage document data such as an image file in the personal box, to which each of the users or groups belongs. It is also referred to as "a box function". "The personal box" is a storage region, in which the document data is to be stored, and therefore, it corresponds to "a folder" or "a directory" in a personal computer, which is provided in a hard disk 111c. An access authority is set with respect to the personal box or data to be stored in the personal box, which can be used by other users accordingly. Hereinafter, the personal box is simply referred to as "the box".

The image reading unit 113 is constituted of a document table, an image sensor such as a CCD, an automatic document feeder and the like. The image reading unit 113 optically reads an image of a document, converts it into a digital data, and thus, creates image data. In other words, the image reading unit 113 is a scanner. The print unit 112 is a printing device (i.e., a printer or an engine) of a laser type or an ink jet type, for printing the image on a predetermined sheet based on print data.

The control unit 111 is constituted of a controller 111a, an operation panel 111b, the hard disk (i.e., the HDD) 111c, an image processor 111d, a network interface 111e, a printer interface 111f, a scanner interface 111g and the like, thus controlling the print unit 112, the image reading unit 113 and the like.

The network interface 111e is an interface for transmitting or receiving the data to or from another MFP 101 via the communication line 102. As the network interface 111e is used a network card (in particular, a network interface card) or a modem. The printer interface 111f and the scanner interface 111g are interfaces to be connected to the print unit 112 and the image reading unit 113, respectively.

The operation panel 111b is a user interface (abbreviated as "a UI") for the user of the MFP 101, and is constituted of a liquid crystal display, an operation unit and the like. The liquid crystal display is adapted to display an operation screen or a setting screen. The operation unit includes buttons or keys such as ten keys and a start button. As the operation panel 111b may be used a touch panel. The user can store the data in the box provided in his or her MFP 101 or another MFP 101 or can utilize the data stored already by operating the operation panel 111b.

The image processor 111d performs the processing of correcting such as image color correction, up-down correction or inclination correction, the processing of converting image data or facsimile data written in a page description language corresponding to the MEP 101 into bit map data, and the processing of converting the image data obtained by the image reading unit 113 or the like into the image data or facsimile data written in the page description language.

The controller 111 is constituted of a circuit for controlling a CPU, a RAM and component parts such as the MFP 101. In the hard disk 111c are stored programs for an operating system (abbreviated as "an OS") and firmware or data. The firmware includes programs for implementing the function of each of a system controller 131, a network controller 132, an engine controller 133, a scanner controller 134, a hard disk controller 135, a user interface controller 136 and a management data producer 137, as shown in FIG. 23, in addition to programs for executing the processing relevant to the function of each of the copying machine, the printer, the scanner, the FAX and the document server, that is, the basic functions of the MFP 101. These programs or data are loaded into the RAM, as required, to be thus executed by the CPU.

All or a part of the programs may be stored in the ROM or a non-volatile memory. Alternatively, all or a part of the functions of the component parts shown in FIG. 23 may be configured in such a manner as to be implemented by a processor (i.e., a controlling circuit).

Hereinafter, a description will be given of the processing contents of each of the component parts shown in FIG. 23 by way of an example in which the user uses the document data stored in each of the MFPs 101 installed in the image processing system 100 by operating the MFP 101A.

The system controller 131 transmits and receives the data to and from each of the network controller 132, the engine controller 133, the scanner controller 134, the hard disk controller 135, the user interface controller 136 and the management data producer 137. That is to say, the system controller 131 controls the entire MFP 101.

The user interface controller 136 performs the processing of displaying a log-on screen HG1, a box selecting screen HG2 and a document selecting screen HG3 on the display screen of the operation panel 111b. Furthermore, the user interface controller 136 performs the processing of detecting a position on the display screen of the operation panel 111b, which is touched (i.e., depressed). These screens are displayed according to the operation by the user in accordance with the following procedures.

When the user selects a document list menu on menu screens, not shown, the user interface controller 136 performs the processing of displaying the log-on screen HG1. Here, the user inputs his or her user ID and password in the text boxes, respectively, by depressing any of buttons displayed on the screen.

And then, the network controller 132 requests the other MFPs 101 (i.e., 101B, 101C . . . ) to transmit information relevant to management of a document. At this time, the input user ID and password are transmitted and noticed to each of the MFPs 101.

The MFP 101 which accepts the request authenticates the user based on the user ID and password which have been transmitted together with each other. If the user can be confirmed to be proper, document information 171 representing a document name, a creation date and time, the number of pages, a creator, a stored box and the like of each of the documents stored in the box provided in the MFP 10.1 and access authority information 172 representing an access authority to each of the documents, given to the user, are transmitted to the MFP 101A, from which the request has been sent.

The network controller 132 in the MFP 101A receives document information 171 and access authority information 172 from another MFP 101. Moreover, the hard disk controller 135 reads the document information 171 on each of the documents stored in the box provided in the MFP 101A and the access authority information 172 on the user. And then, the management data producer 137 produces management data 173 based on the received or read information. In other words, since the authentication has been already recognized by the MFP 101, no authentication is performed in the MFP 101A.

Management data 173 includes document identification information and access restriction information. The document identification information is based on the document information 171: in contrast, the access restriction information is based on the access authority information 172.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image processing system comprising:
    a document storage apparatus for storing document data therein;
    an image processing apparatus connected to the document storage apparatus via a network, for processing the document data transmitted from the document storage apparatus and for storing user account data;
    a first authenticator for performing user authentication at the time of an access to the document storage apparatus;
    a second authenticator for performing user authentication at the time of an access to the image processing apparatus; and
    a controller for;
        controlling the authenticators so that when authentication is established by the first authenticator, authentication is not performed by the second authenticator, and
        (i) performing user account processing in a case where a user is authenticated by the first authenticator and a user account exists as user account data in the image processing apparatus, (ii) performing account processing as a public user in a case where the user is authenticated by the first authenticator and there exists no user account data in the image processing apparatus, and (iii) performing an authentication process with the second authenticator in a case where the user is not authenticated by the first authenticator.

2. The image processing system according to claim 1, wherein first authentication information in the first authenticator is added to the document data to be transmitted to the image processing apparatus from the document storage apparatus when first authentication is established.

3. The image processing system according to claim 2, wherein the first authentication information to be added includes information on the authentication result by the first authenticator and user identification information which has been input.

4. The image processing system according to claim 2, wherein the functions of the image processing apparatus are restricted based on the first authentication information that is added.

5. The image processing system according to claim 1, wherein the image processing apparatus is at least one of a multi-functional image forming apparatus, a printer and a router.

6. An image processing apparatus connected to a document storage apparatus for storing user account data and document data therein via a network, for processing the document data transmitted from the document storage apparatus, the image processing apparatus comprising:
    an authenticator for performing user authentication; and
    a controller for controlling an authenticating operation by the authenticator based on a result of the user authentication performed at the time of an access to the document storage apparatus, and for further controlling the authenticating operation so that the authentication is not performed in the case where the user authentication performed at the time of the access to the document storage apparatus has already been established,
    wherein (i) user account processing is performed in a case where a user is authenticated at the time of access to the document storage apparatus and a user account exists as user account data in the image processing apparatus, (ii) account processing is performed as a public user in a case where the user is authenticated at the time of access to the document storage apparatus and there exists no user account data in the image processing apparatus, and (iii) an authentication process is performed with the authenticator in a case where the user is not authenticated at the time of access to the document storage apparatus.

7. The image processing apparatus according to claim 6, wherein in the case where the user authentication performed at the time of the access to the document storage apparatus is established, document data added with information on the authentication that is established is received from the document storage apparatus.

8. The image processing apparatus according to claim 7, wherein the information to be added includes information on the authentication result performed at the time of the access to the document storage apparatus and user identification information which has been input.

9. The image processing apparatus according to claim 7, wherein the controller restricts functions based on the information that is added.

10. An image processing method comprising the steps of:
    first authenticating a user at the time of an access to a document storage apparatus for storing document data therein;
    second authenticating a user at the time of an access to an image processing apparatus connected to the document storage apparatus via a network, for processing the document data transmitted from the document storage apparatus;
    controlling the authenticating so that when authentication is established in the first authenticating step, authentication is not performed in the second authenticating step, and (i) performing user account processing in a case where a user is authenticated by the first authenticating step and a user account exists as user account data in the image processing apparatus, (ii) performing account processing as a public user in a case where the user is authenticated by the first authenticating step and there exists no user account data in the image processing apparatus, and (iii) performing an authentication process with the second authenticating step in a case where the user is not authenticated by the first authenticator.

11. The image processing method according to claim 10, wherein first authentication information in the first authenticating step is added to the document data to be transmitted to the image processing apparatus from the document storage apparatus in the case where the authentication is established in the first authenticating step.

12. The image processing method according to claim 11, wherein the first authentication information to be added includes information on the authentication result in the first authenticating step and user identification information which has been input.

13. The image processing method according to claim 11, wherein the functions of the image processing apparatus are restricted based on the first authentication information that is added.

14. The image processing method according to claim 10, wherein the image processing apparatus is at least one of a multi-functional image forming apparatus, a printer and a router.

* * * * *